(12) United States Patent
Petrick et al.

(10) Patent No.: US 7,703,737 B2
(45) Date of Patent: Apr. 27, 2010

(54) POLE MOUNTING SYSTEM

(75) Inventors: Christopher Petrick, Park Ridge, IL (US); Robert Coon, Chicago, IL (US); Clifford Krapfl, Chicago, IL (US); Jimmy-Quang Viet Doan, Chicago, IL (US); John B. Freese, Evanston, IL (US); Bjorn Gunderson, Chicago, IL (US)

(73) Assignee: Bretford Manufacturing, Inc., Franklin Park, IL (US)

( * ) Notice: Subject to any disclaimer, the term of this patent is extended or adjusted under 35 U.S.C. 154(b) by 70 days.

(21) Appl. No.: 11/413,288

(22) Filed: Apr. 28, 2006

(65) Prior Publication Data

US 2006/0245147 A1    Nov. 2, 2006

Related U.S. Application Data

(60) Provisional application No. 60/675,757, filed on Apr. 28, 2005.

(51) Int. Cl.
*F16M 11/00* (2006.01)
(52) U.S. Cl. .................. 248/407; 248/408; 248/146; 248/423
(58) Field of Classification Search ........... 248/146, 248/149, 151, 127, 407, 408, 159, 423, 524, 248/519; 403/252, 253, 254, 255, 331; 211/103, 211/187, 190, 207, 192, 193
See application file for complete search history.

(56) References Cited

U.S. PATENT DOCUMENTS 4,163,537 A * 8/1979 Mourgue .................. 248/188.1

(Continued)

FOREIGN PATENT DOCUMENTS

DE     197 48 480 A1    5/1999

(Continued)

OTHER PUBLICATIONS

International Search Report and Written Opinion, dated Nov. 3, 2006 from corresponding PCT patent application No. PCT/US2006/016552.

(Continued)

*Primary Examiner*—A. Joseph Wujciak, III
(74) *Attorney, Agent, or Firm*—Anderson Gorecki & Manaras, LLP

(57) ABSTRACT

A pole mounting system includes a pole having at least one channel, and a spike having a finger configured to be received in the channel of the pole. The finger is attached to a neck that is configured to extend out of the channel and connect to a connector. The connector may be configured in a number of different ways depending on the particular type of device to be suspended on the pole. For example, the connector may be configured to connect to different types of arms that may be used to hold a flat panel display, or may be configured to hold other things such as a table. The finger is elongate and configured to engage the interior of the channel when the weight of the flat panel display is placed on the spike. Optionally, a spring-loaded pin may be provided to temporarily hold the spike in place while the spike is screwed into place in the channel through the use of set screws. Wire management may be provided within the channel.

4 Claims, 23 Drawing Sheets

U.S. PATENT DOCUMENTS

| | | | |
|---|---|---|---|
| 4,458,455 A * | 7/1984 | Tollstoff de Voss | 52/38 |
| 5,915,803 A * | 6/1999 | Daugherty et al. | 312/263 |
| 6,119,317 A | 9/2000 | Pfister et al. | |
| 6,554,235 B1 * | 4/2003 | Fortier | 248/122.1 |
| 7,178,765 B2 * | 2/2007 | Huang | 248/122.1 |
| 7,293,935 B2 * | 11/2007 | Band et al. | 403/254 |
| 2004/0251388 A1 | 12/2004 | Williams | |

FOREIGN PATENT DOCUMENTS

| | | | |
|---|---|---|---|
| EP | 1 312 852 A | 5/2003 | |
| EP | 1 331 430 A | 7/2003 | |
| JP | 2000091128 A * | 3/2000 | |

OTHER PUBLICATIONS

Invitation To Pay Additional Fees with partial International Search dated Sep. 22, 2006 from corresponding PCT patent application No. PCT/CA2006/016552.

International Preliminary Report on Patentability from corresponding PCT patent application No. PCT/US2006/016552.

* cited by examiner

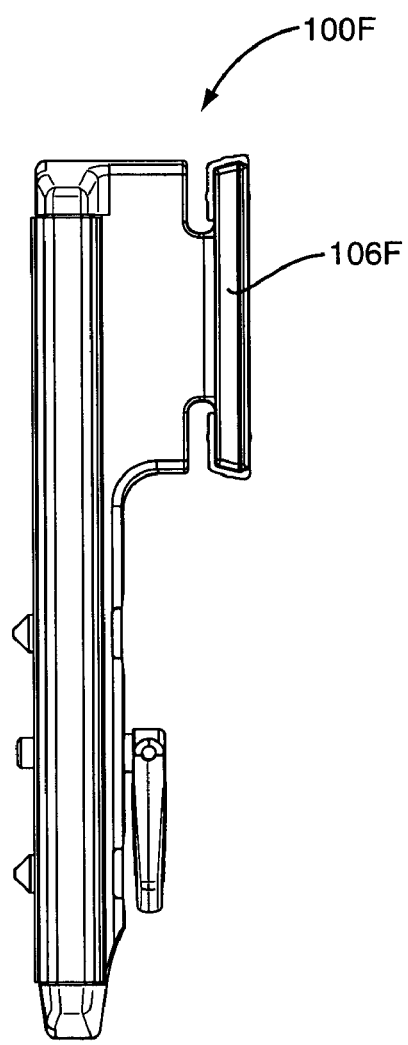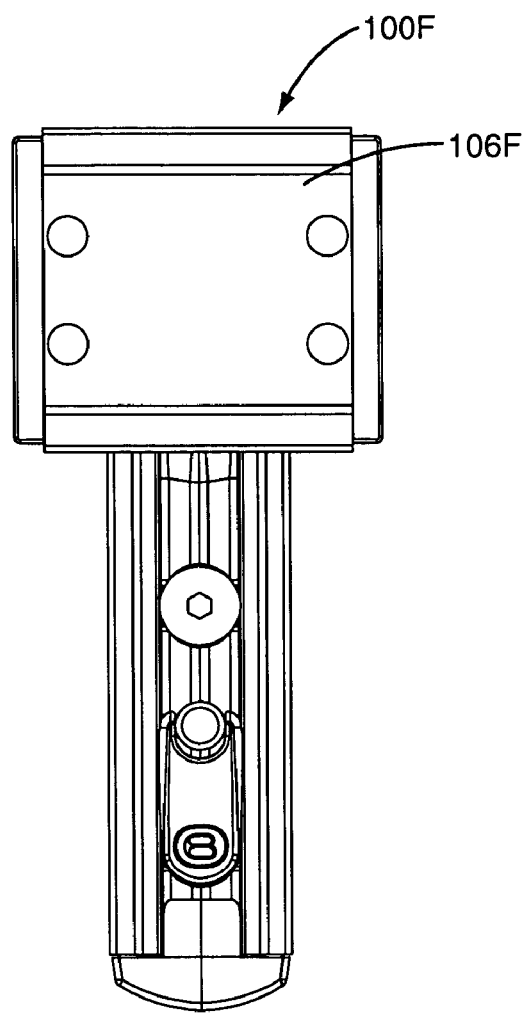
FIG. 14  FIG. 15

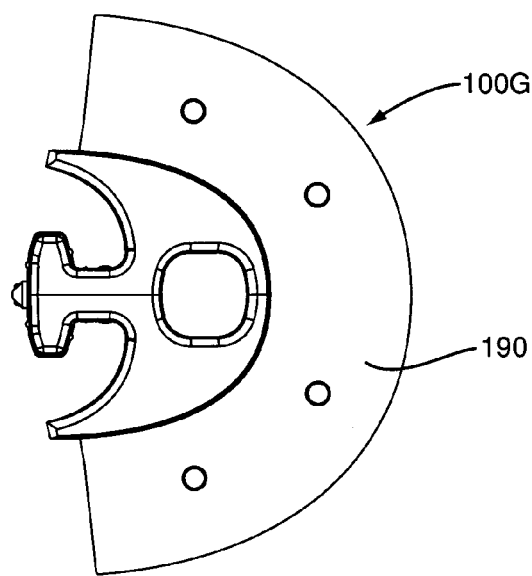
FIG. 19
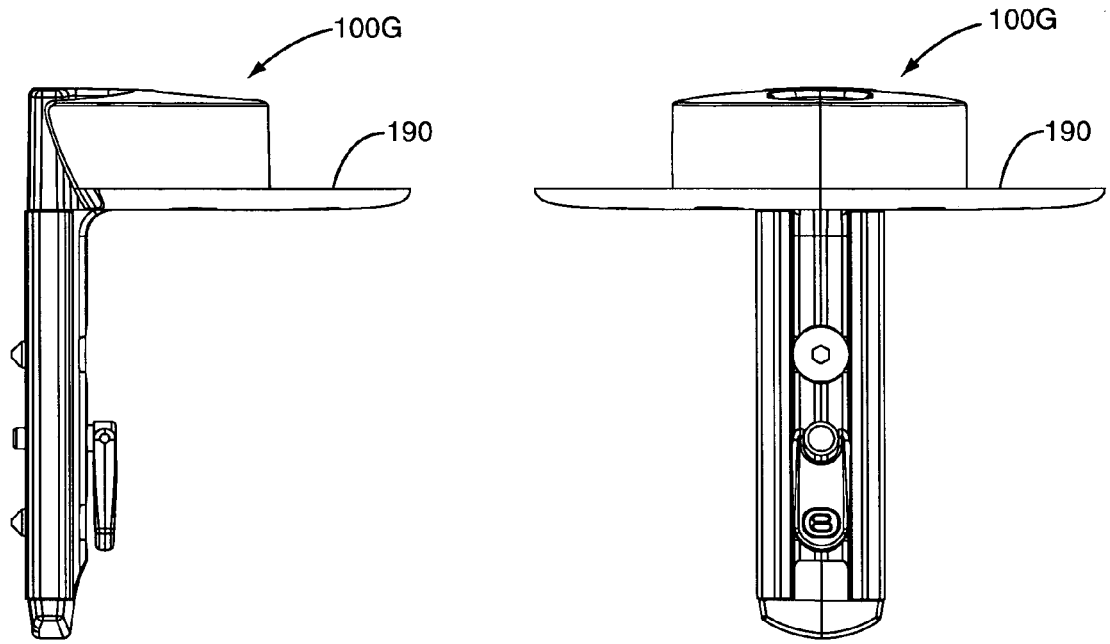
FIG. 17  FIG. 18

POLE MOUNTING SYSTEM

CROSS-REFERENCE TO RELATED APPLICATIONS

This application claims the benefit of prior provisional application No. 60/675,757, filed Apr. 28, 2005, the content of which is hereby incorporated herein by reference. This application is related to U.S. patent application entitled "K-base for a Pole Mounting System" (Ser. No. 11/414,829) filed concurrently herewith.

BACKGROUND OF THE INVENTION

1. Field of the Invention

The present invention relates to flat panel display mounting systems and, more particularly, to a pole mounting system.

2. Description of the Related Art

Flat panel displays, such as televisions and computer monitors, may be formed using many technologies. Currently, Liquid Crystal Displays (LCDs) and plasma displays are mass marketed as flat panel displays, although other flat panel display technologies also exist and may be developed over time.

Flat panel displays may be supported on desk stands, wall mounts, pole mounts, or may be supported in numerous other ways. For example, the displays may be mounted individually or in groups on a horizontal surface such as a desk, table, floor or ceiling, or may be mounted on a vertical surface such as a wall, cubicle, or other enclosure. Displays may also be mounted to be mobile, such as on a computer cart or a free-standing mobile unit. Depending on the type of support system, the displays may be free standing or may be more directly connected to another surface such as a wall, ceiling, or other structure.

Pole mounting systems are generally used to enable a flat panel display to be suspended above a surface. For example, a pole mounting system may be used to hang a flat panel display on a computer cart, free-standing base, next to a wall, above a desk, or in myriad other instances. While various pole mounting systems have been developed over the years, it would still be advantages to provide another pole mounting system. Additionally, it would be advantageous to provide a base configured to provide mobile support for the pole mounting system.

SUMMARY OF THE INVENTION

A pole mounting system includes a pole having at least one channel, and a spike having a finger configured to be received in the channel of the pole. The finger is attached to a neck that is configured to extend out of the channel and connect to a connector. The connector may be configured in a number of different ways depending on the particular type of device to be suspended on the pole. For example, the connector may be configured to connect to different types of arms that may be used to hold a flat panel display, or may be configured to hold other things such as a table. The finger is elongate and configured to engage the interior of the channel when the weight of the flat panel display is placed on the spike. Optionally, a spring-loaded pin may be provided to temporarily hold the spike in place while the spike is screwed into place in the channel through the use of set screws. Wire management may be provided within the channel.

BRIEF DESCRIPTION OF THE DRAWINGS

Aspects of the present invention are pointed out with particularity in the appended claims. The present invention is illustrated by way of example in the following drawings in which like references indicate similar elements. The following drawings disclose various embodiments of the present invention for purposes of illustration only and are not intended to limit the scope of the invention. For purposes of clarity, not every component may be labeled in every figure. In the figures:

FIGS. 7-10 show a first embodiment of a spike that may be used in connection with the pole of FIGS. 2-4, according to an embodiment of the invention, in which FIG. 7 is a side view of the spike, FIG. 8 is a front view of the spike, FIG. 9 is a top view of the spike, and FIG. 10 is a perspective, partially disassembled view of the spike;

FIGS. 14-16 show another embodiment of a spike that may be used in connection with the pole of FIGS. 2-4, according to an embodiment of the invention, in which FIG. 14 is a side view of the spike, FIG. 15 is a front view of the spike, and FIG. 16 is a perspective, partially disassembled view of the spike;

FIGS. 17-20 show another embodiment of a spike that may be used in connection with the pole of FIGS. 2-4, according to an embodiment of the invention, in which FIG. 17 is a side view of the spike, FIG. 18 is a front view of the spike, FIG. 19 is a top view of the spike, and FIG. 20 is a perspective, partially disassembled view of the spike;

FIGS. 23-24 show an embodiment of a wire management clip that may be used in connection with the pole of FIGS. 2-4, according to an embodiment of the invention, in which FIG. 23 is a front view of the wire management clip, and FIG. 24 is a top view of the wire management clip;

DETAILED DESCRIPTION

The following detailed description sets forth numerous specific details to provide a thorough understanding of the invention. However, those skilled in the art will appreciate that the invention may be practiced without these specific details. In other instances, well-known methods, procedures, components, and dimensions, have not been described in detail so as not to obscure the invention.

Figure 1:
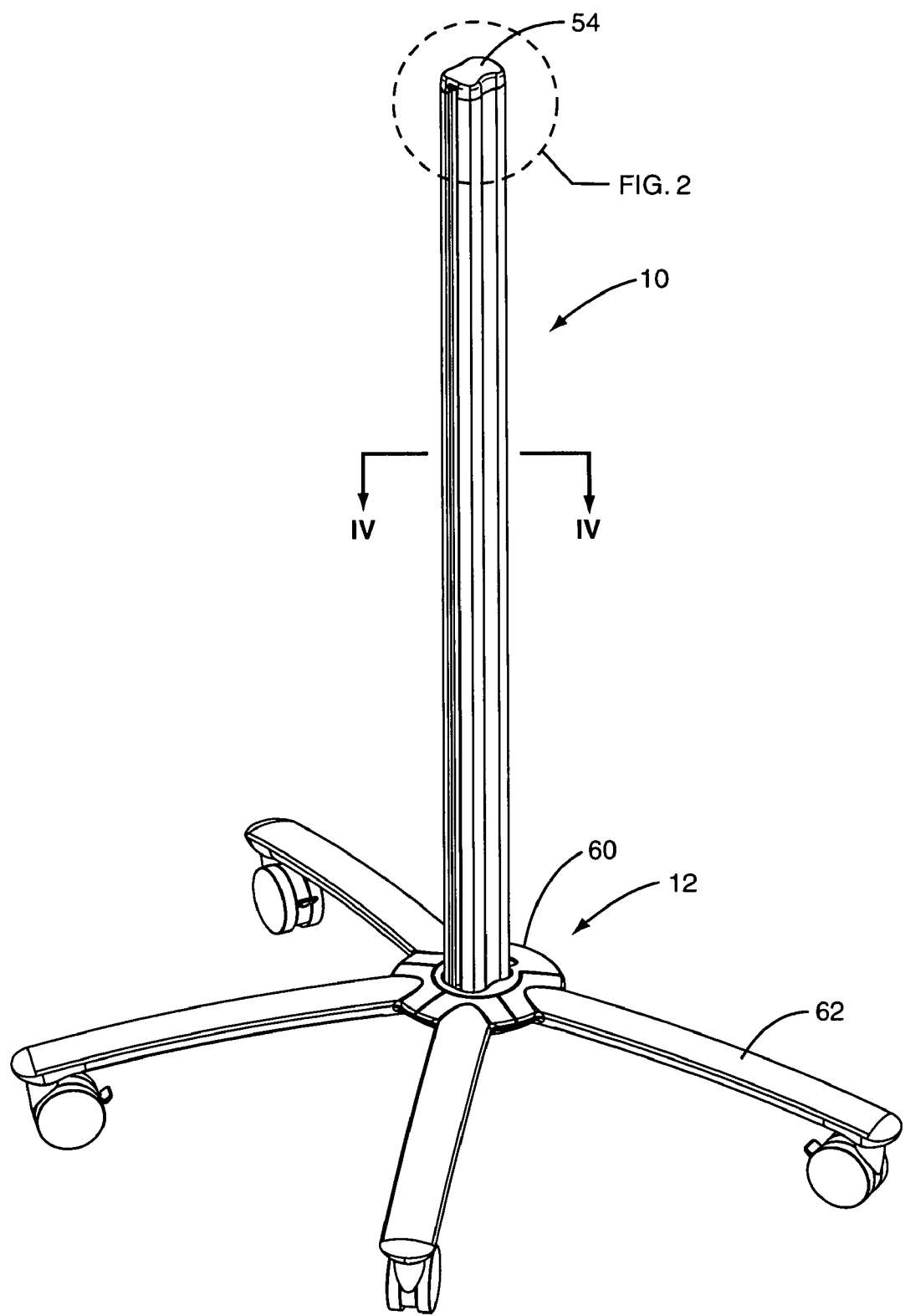
FIG. 1 is a perspective view of a pole mounting system according to an embodiment of the invention.

FIG. 1 illustrates an embodiment of a pole mounting system 10 that may be used to support a flat panel display in which the pole is attached to a K-shaped base 12. The pole mounting system 10 may be connected to other types of movable bases as well, such as to a computer cart or a movable desk. Alternatively, the pole mounting system may be mounted to a non-movable base such as to a base without wheels. Still alternatively the pole mounting system may be mounted to a fixed surface such as a desk, floor, or a wall using appropriate hardware. The invention is not limited in the manner in which the pole mounting system is supported and, accordingly, the invention is not limited to use with the particular K-shaped base shown in FIG. 1. However, since the K-shaped base shown in FIG. 1 is configured to operate with the pole mounting system shown in several of the other figures, the K-shaped base will be described in greater detail below in connection with FIGS. 25-29.

In the following description, the term "pole mounting system" will be used to describe the pole and one or more attachments that may connect to the pole. The attachments that are configured to be connected to the pole are referred to as spikes. As shown in FIG. 1, the pole has at least one channel running along its length. In operation, a finger from a spike is inserted into the channel and the spike is then moved to an appropriate desired position along the pole. The finger on the spike is elongated and enables the spike to remain aligned with the channel so that the finger may glide up and down within the channel. The length of the finger, therefore, may be adjusted depending on the particular dimensions of the channel. The spike may be held in place at that position via a spring-loaded pin and/or one or more set screws.

When weight is added to the spike, such as when one or more flat panel displays are hung on the spike, the finger extending downward within the channel compresses against an inner surface of the channel to cause a compression fit to be developed. This compression fit causes the spike to be more strongly retained in the desired position along the channel to help prevent the spike from slipping down the channel. Where it is desired to reposition the spike within the channel, the weight of flat panel display may be independently supported and the spike may be slid within the channel to the new desired position.

Figure 2:
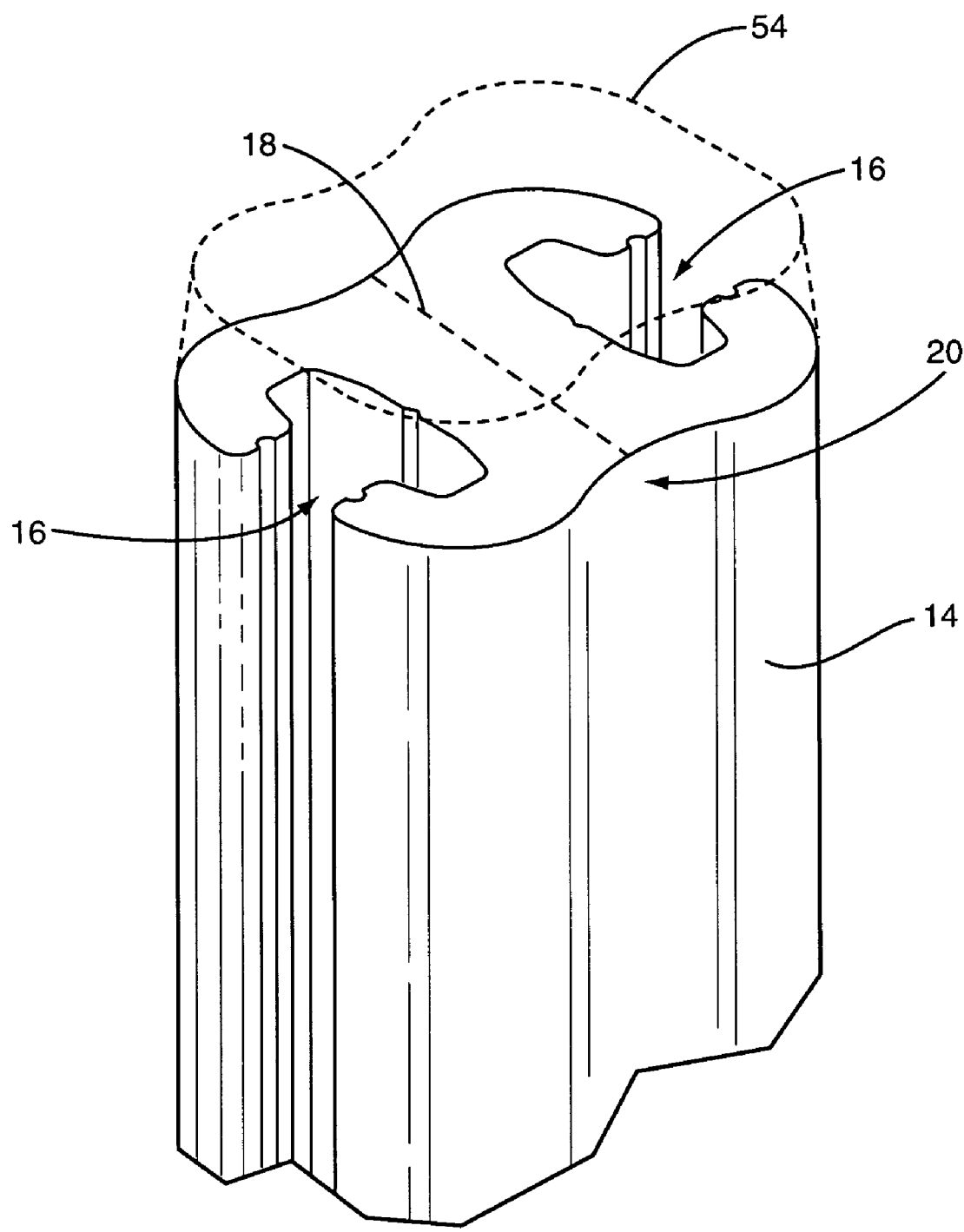
FIG. 2 is an enlarged perspective view of a top of a pole of the pole mounting system according to an embodiment of the invention.

FIG. 2 shows the top portion of the pole shown in FIG. 1. As shown in FIG. 2, the pole 14 in this embodiment has two channels 16, one on each side of the pole 14, each of which is configured to receive one or more spikes to enable the spikes to be disposed along the length of the pole. The shape of the channels will be described in greater detail below. Although the pole of FIG. 2 has been shown as having two channels, the invention is not limited in this regard as additional numbers of channels may be used as well. For example, the pole may be cut along the dashed line 18 and have only one channel. This embodiment may be used, for example, when the pole is to be mounted along a wall. Alternatively, the pole may be configured to have 3 or more channels 16, for example where multiple flat panel displays are to be hung from the same pole.

A cap 54 may be provided on the top end of the pole to close the interior of the pole from view when in use. The cap 54 may also have an internal channel extending through it to enable wires to be wrapped around the top of the pole so that the wires may extend from one channel to the other. The invention is not limited to the particular configuration of the cap as many different caps may be used.

Figure 8:
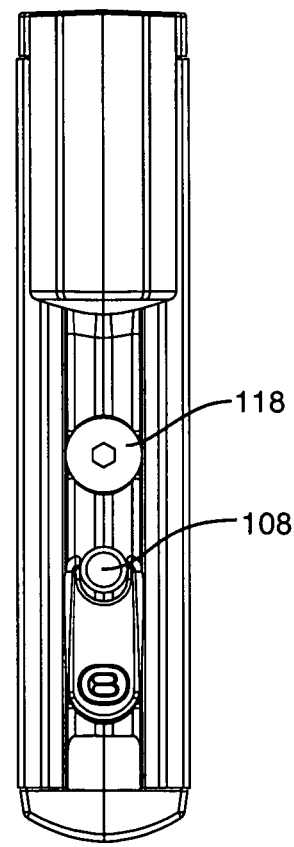
Figure 10:
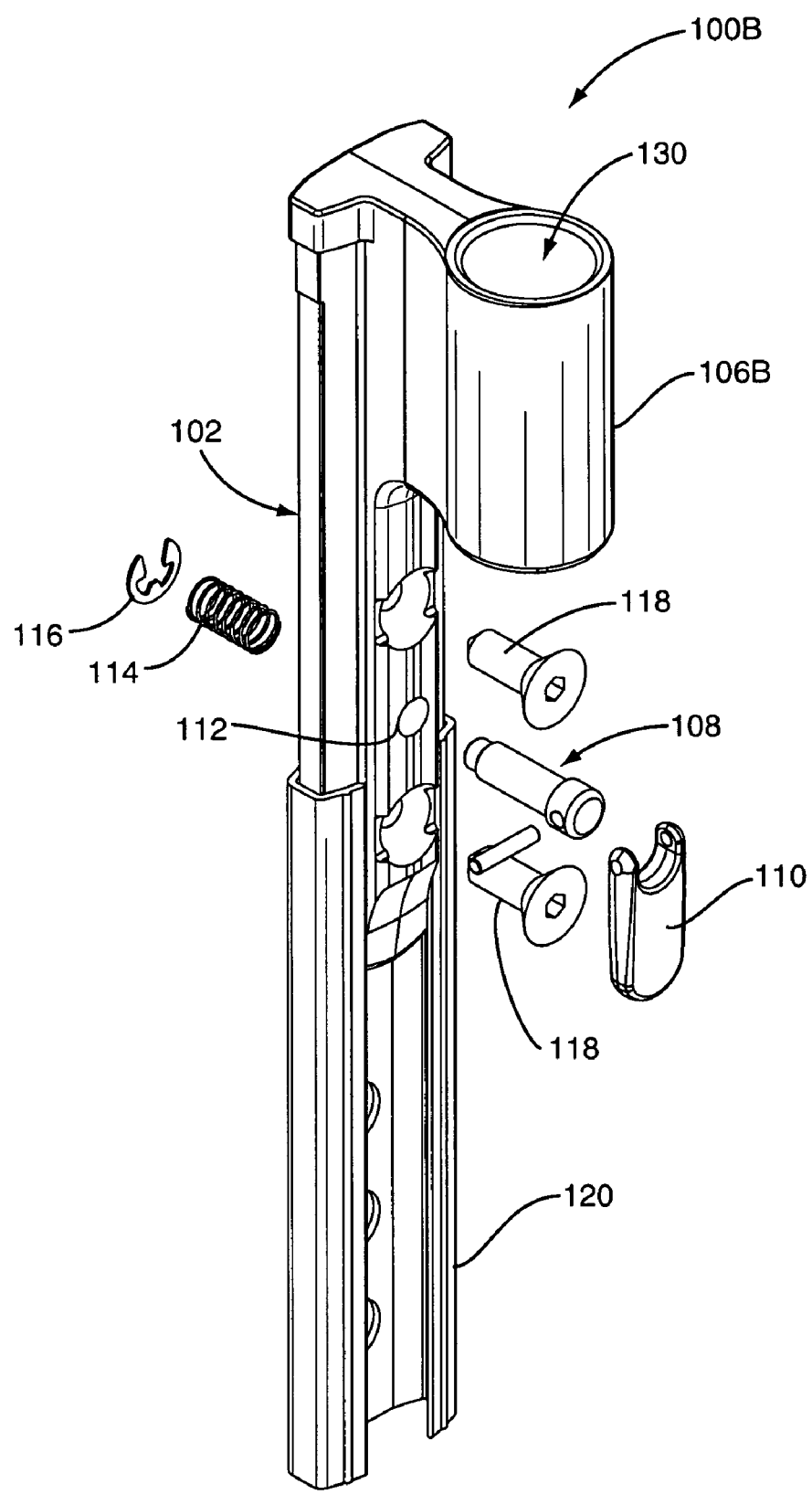

In the embodiment shown in FIG. 2, the pole has a pair of indentations 20 on the sides that don't carry the channels provides the pole with an approximate FIG. 8 profile. The invention is not limited to the use of a pole with concave indentations 20 as shown, as other embodiments may be formed using a pole with a square cross-section, an elliptical cross-section, or a circular cross-section. The invention is thus not limited to the use of a pole with concave indentations as shown in the Figs.

Figure 3:
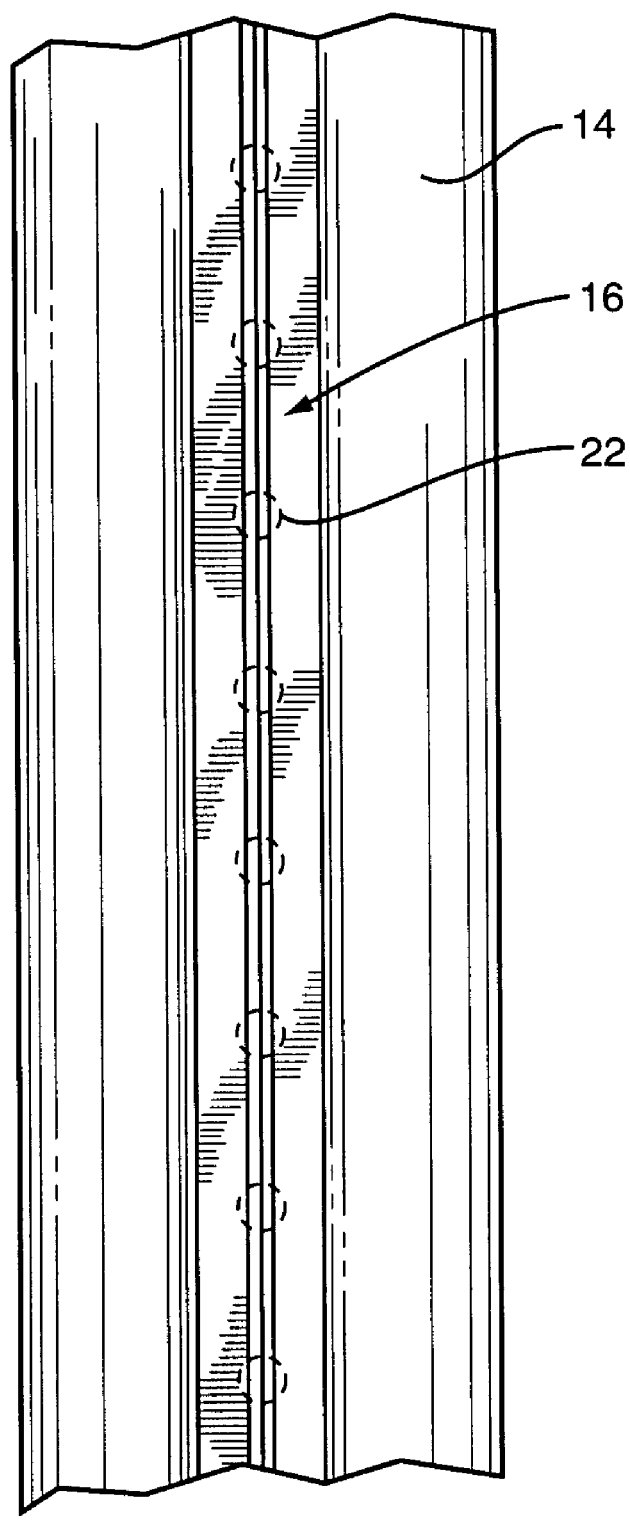
FIG. 3 is a side view of a portion of the pole of FIG. 3 showing a channel in the pole mounting system.

FIG. 3 shows a portion of a pole in which one of the channels 16 is shown in greater detail. As shown in FIG. 3, the channel runs along the length of the pole. In one embodiment, the pole is extruded aluminum having a constant cross-section such as the cross section described below in connection with FIG. 4. In another embodiment, the pole may be machined so that the channels 16 may extend only partially from one end of the pole and thus not run the entire length of the pole. The invention is not limited to an embodiment in which the channels run the entire length of the pole.

As shown in FIG. 3, apertures 22 may optionally be formed in a back wall of the channel 16. As mentioned above, when a spike is used in connection with the pole 14, a finger of the spike may extend into the channel, and the location of the spike along the pole may be adjusted by sliding the spike along the channel. Once the spike is in a desired location, set screws associated with the spike may be tightened. The apertures 22 may be configured to receive the set screws to enable the spike to be securely positioned at a desired location. Alternatively, one or more spring-biased pins may be used to secure the spike at a particular location, and the apertures 22 may be configured to receive an end of a spring-biased pin. While an embodiment has been shown in connection with FIG. 3 in which apertures 22 are formed in a back wall of the channel, the invention is not limited in this regard, as alternatively the set screw/spring pin may frictionally engage the channel directly and not selectively engage apertures formed in the back wall of the channel.

Figure 4:
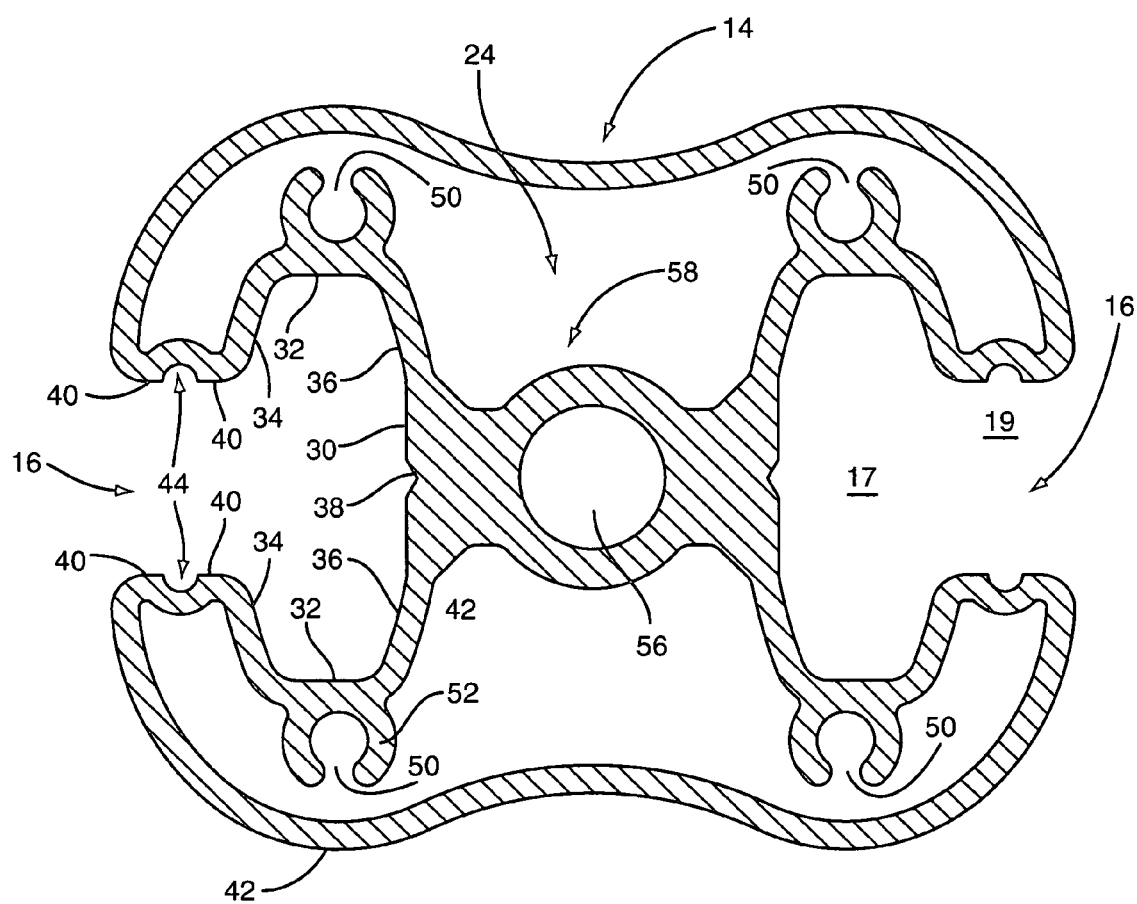
FIG. 4 is a cross-sectional view of the pole of FIG. 1 taken along line IV-IV of FIG. 1.

FIG. 4 shows a cross-section of a pole according to an embodiment of the invention. In the embodiment shown in FIG. 4, the pole has been shown as having a hollow interior 24. The invention is not limited in this regard as materials other than air, for example structural foam, epoxy, plastic, or resin, may be used as well to provide the pole with additional strength and to deaden any acoustic properties of the pole.

As shown in FIG. 4, the pole 14 has two channels 16. Each channel 16 has a wide inner region 17 and a narrower throat region 19. The wide inner region 17 is defined by a back wall 30, a pair of side walls 32 and a pair of tapered front walls 34. The back wall 30 also has a pair of tapered sections 36 which, in the illustrated embodiment, each extend approximately 25% of the distance from the side walls 32 to a center of the channel 16. The tapered sections may be tapered at approximately 15 degrees relative to the flat portion of the back wall. The invention is not limited to these particular dimensions, however, as other dimensions may be used as well for the tapered portions and the back wall section. A triangular groove 38 may be provided in the center of the back wall 30, for example to receive a point of a set screw. The invention is not limited to the use of a channel formed to include the central triangular groove.

The throat region 19 of the channel 16 is defined by a pair of pair of walls 40 extending from an outside surface 42 of the pole 14 to the wide inner region 17. Optionally, a pair of semicircular indentations 44 may be formed in the walls 40 to receive cord management clips, an example of which is described below in connection with FIGS. 23 and 24.

In operation, a finger of a spike will be inserted into the wide inner region 17 and a neck of the spike will extend through the throat region 19. The finger, in this embodiment, helps to align the spike with the channel so that the neck does not torque within the channel. Thus, the finger helps the spike glide within the channel and serves to reduce the tendency for the spike to bind in the channel. As shown in the figures, the finger 102 may be placed to extend in one direction from the neck 104 or may be placed so that the connector is more centrally located along the finger. Placing the connector at one end of the finger enables the spike may be used with the finger pointing downward so that the spike may be used close to the end of the pole, or used pointing upward so that the spike may be used closer to the bottom of the pole.

When weight is placed on a connector attached to the neck of the spike, the weight will be transferred by the neck to the finger, to cause the bottom portion of the finger to be pressed toward the central region of the pole, and to cause the top of the finger to be pressed outward away from the pole. The manner in which the weight is transferred to the spike and the design of the angled surfaces 34, 36 causes a compression fit to be formed between the inside of the channel and the finger. Specifically, if sufficient weight is placed on the spike, the angled surface 34 will cause the walls 40 to move apart slightly to cause the throat to splay slightly. In connection with this motion, the angled surfaces of the finger will interact with the angled surfaces 34 of the wide inner region to cause a compression fit to be formed between the finger and the pole.

Figure 5:
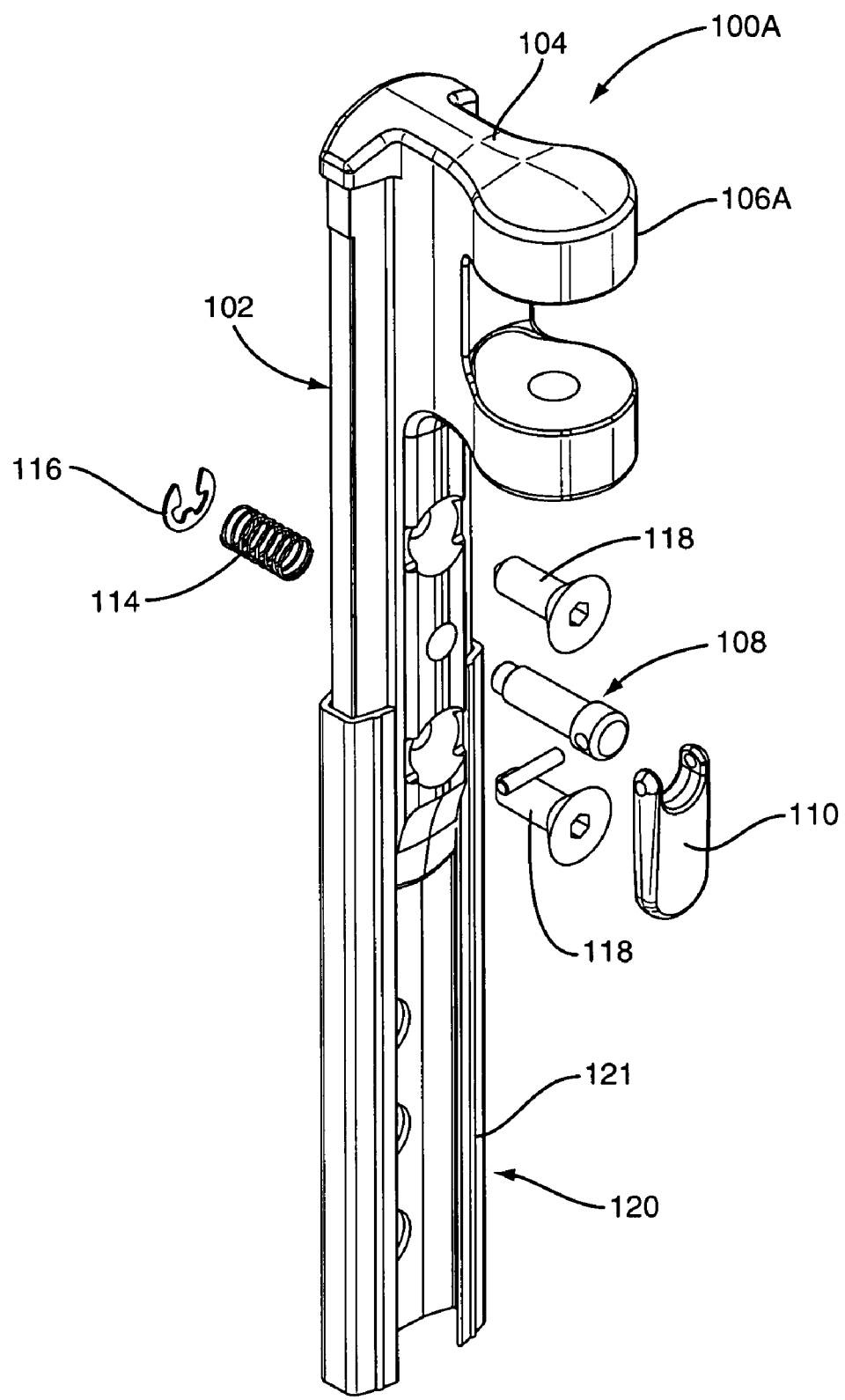
FIG. 5 is a perspective, partially disassembled view of a spike that may be used in connection with the pole of FIGS. 2-4 according to an embodiment of the invention.

Optionally, as discussed in greater detail below, a deformable sleeve 120 (see FIG. 5) may be formed over the finger in-between the finger and the angled walls 34, 36 of the wide inner region. Deformation of the sleeve may enhance the compression fit caused by putting weight on the spike. Additionally, as shown in FIG. 5, the sleeve 120 may have one or more sacrificial ribs 121 formed on an outer surface, which may be partially or entirely removed by the force of inserting the spike into the channel. The sacrificial ribs may help to ensure that there is a tight fit between the spike and the channel.

The pole may also include one or more apertures or partial apertures to enable the pole to be anchored to different structures. For example, in the example shown in FIG. 4, the pole 14 includes a set of partial apertures 50 formed by semi-circular side walls 52. The partial apertures 50 may be sized to receive bolts so that the end of the pole may be attached to a structure such as the K-base shown in FIG. 1. Additionally, the partial apertures 50 may be used to connect a cap 54 to the top of the pole, such as the cap 54 shown in FIGS. 1 and 2. The apertures may be threaded before receiving the bolts or self-tapping bolts may be used to thread into the partial apertures 50. Although partial apertures have been shown, the invention is not limited to the use of partial apertures or to the particular placement of the holes, as other types of apertures, different numbers of apertures, and differently placed apertures may be used as well.

The embodiment shown in FIG. 4 also includes a central aperture 56 formed in a solid central region 58. The central aperture 56 is designed to receive a large bolt or rod so that the pole may be mounted securely on a cart or other structure. For example, in the K-base shown in FIG. 1, the pole is connected to a hub 60 at its bottom end. Legs 62 extend from the hub. To secure the hub 60 to the pole 14, a large bolt may be threaded through the hub and into the central aperture 56. Alternatively, the hub 60 may be provided with a post extending upward from the center of the hub and configured to fit into the central aperture 65. In either of these embodiments, the central aperture enables the post to be securely connected to the hub so that the joint is better able to resist torsional forces that may be created by forces exerted closer to the top of the post.

The central aperture 56 and partial apertures 50 may be used individually or collectively to anchor the pole on the K-base or to another structure such as a computer cart. Additional details associated with the structure of the K-base and central hub are discussed in greater detail below in connection with FIGS. 26-30.

The pole may be made from extruded aluminum, an aluminum alloy, or another metal. Alternatively, the pole may be made of plastic material, optionally reinforced with metal rods or other forms. For example, the pole may be formed from a pair of metal channels encased in a plastic pole structure. The pole may also be formed from wood or other malleable material. The invention is thus not limited to an embodiment formed using a particular type of material. Optionally, the pole may be coated such as powder coated to provide a uniform texture to the surface and to help preserve the pole. The invention is not limited to any particular way in which the outer surfaces and/or inner surfaces are finished.

Figure 6:
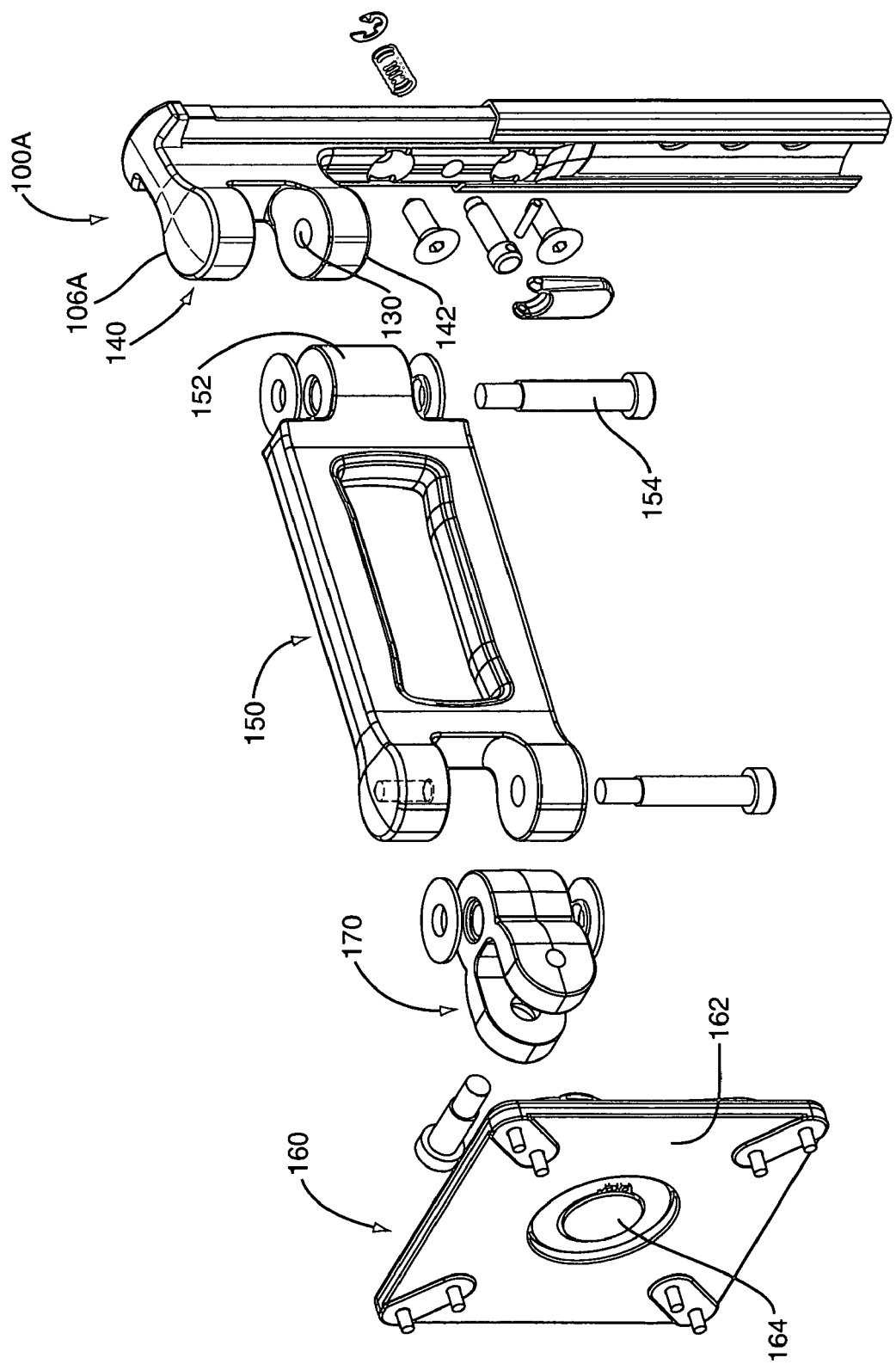
FIG. 6 is a perspective partially disassembled view of the spike of FIG. 5 configured to connect with an arm and a flat panel display VESA plate according to an embodiment of the invention.
Figure 9:
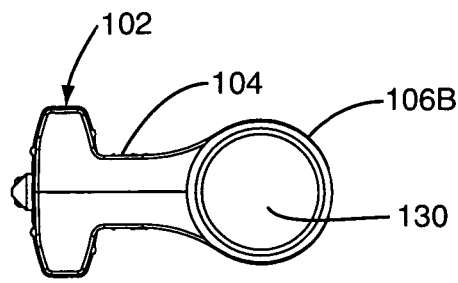
Figure 7:
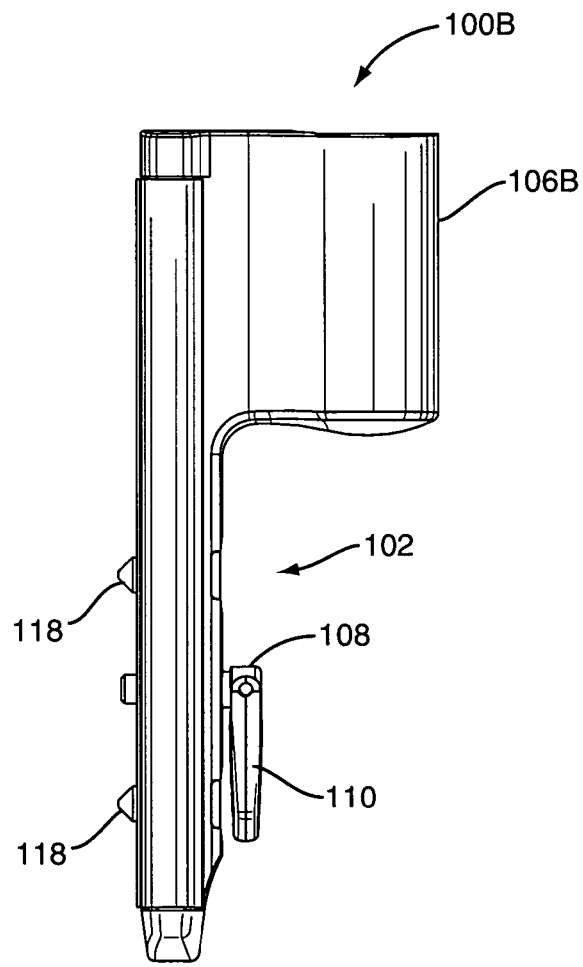
Figure 11:
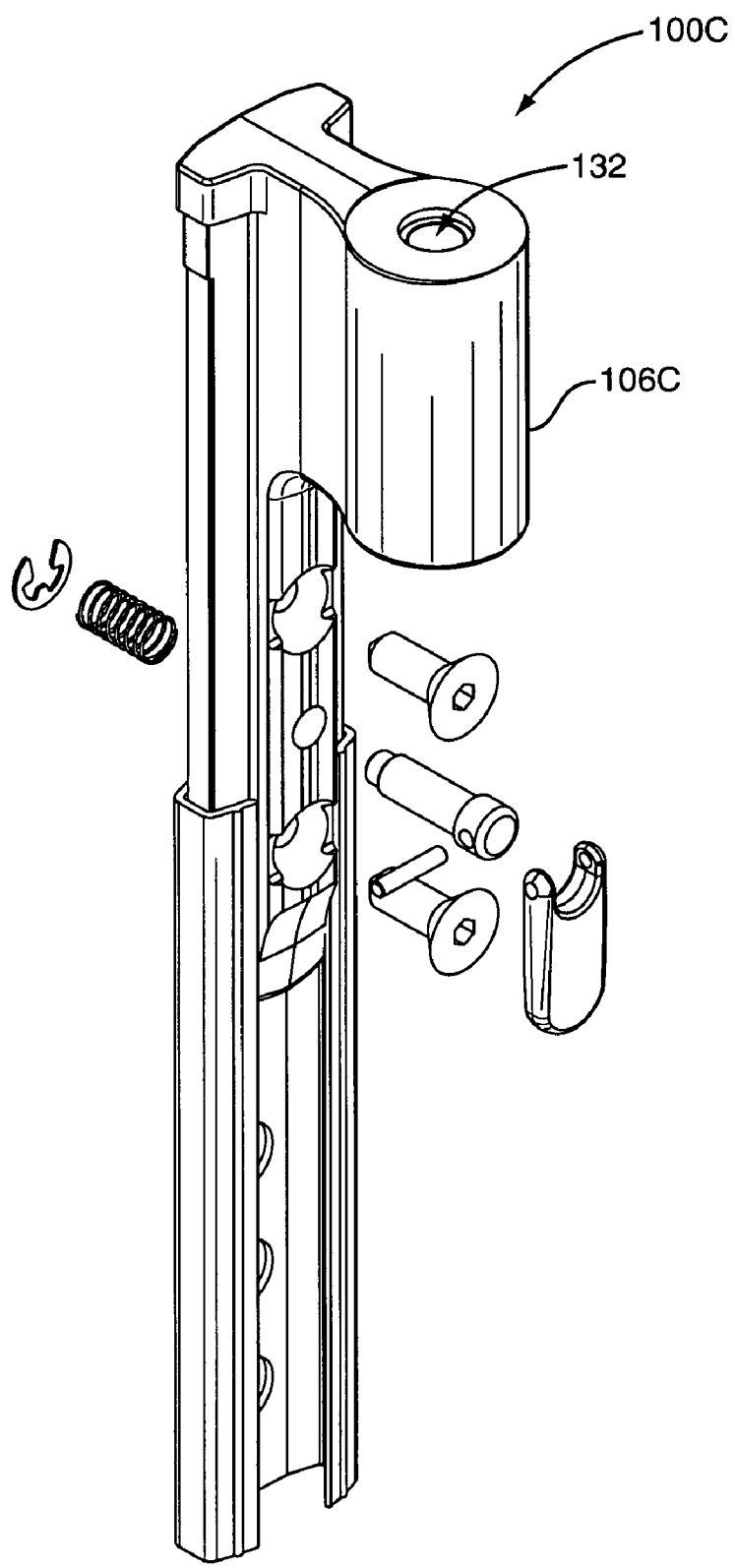
FIGS. 11-13 are perspective partially disassembled views of additional spikes that may be used in connection with the pole of FIGS. 2-4 according to an embodiment of the invention.
Figure 12:
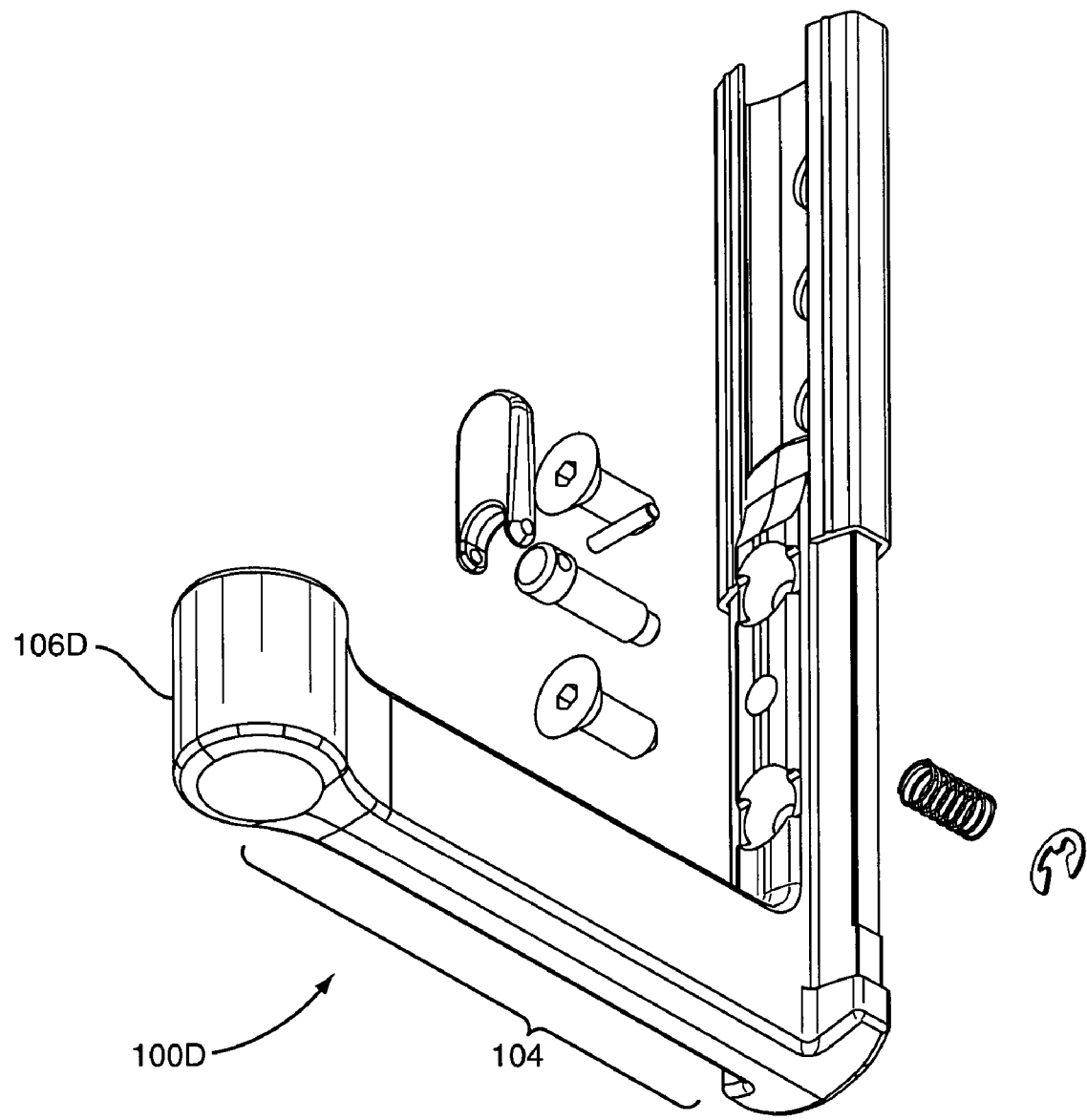
Figure 13:
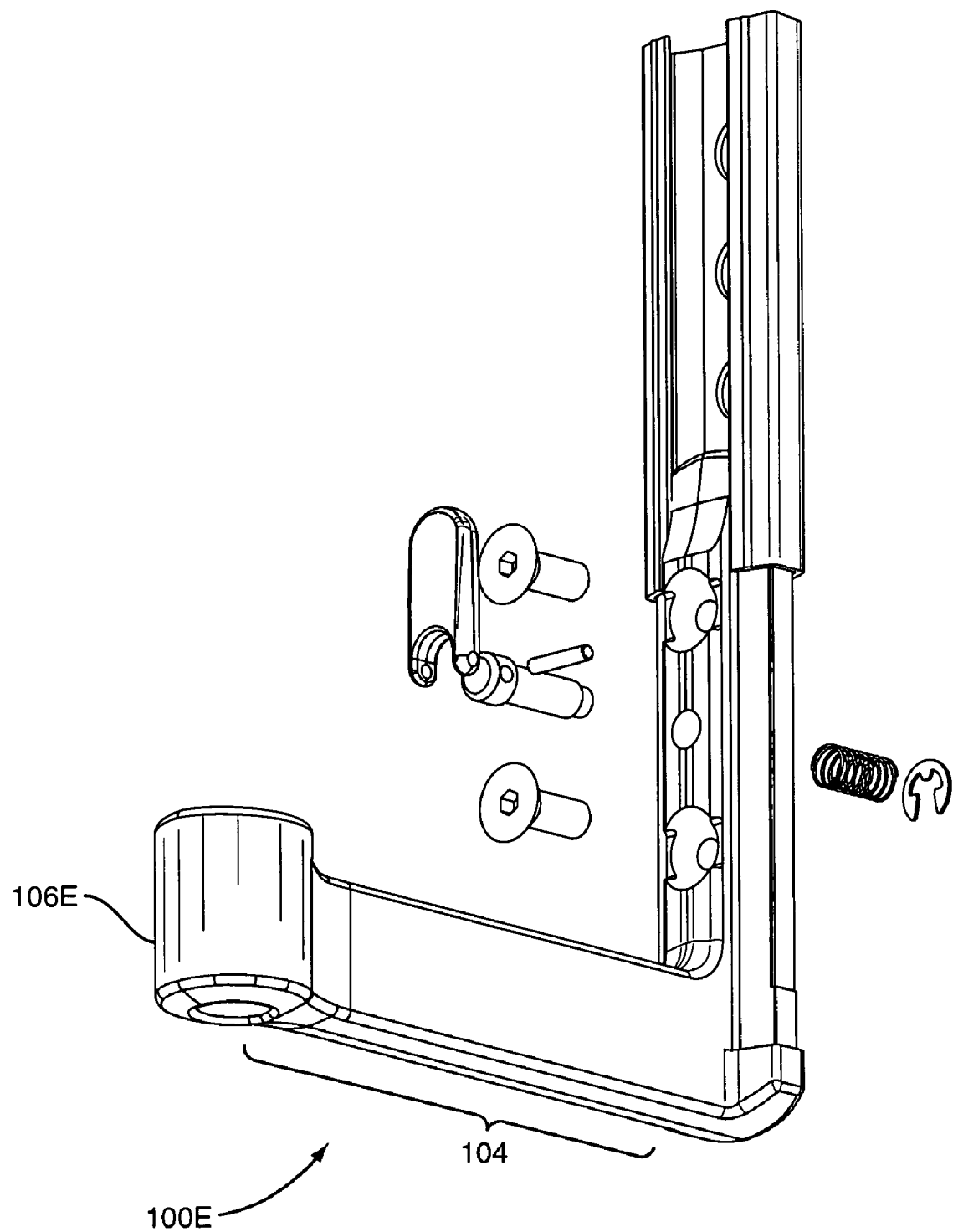

FIGS. 5-6 illustrate an example of a spike 100A that may be used in connection with the pole described above. In FIGS. 5-6, the spike 100A has a finger 102 that is configured to be slid into one of the channels 16 in pole 14. The finger is connected via a neck 104 to a connector 106A. FIGS. 5-22 show different spike configurations in which each spike has a finger 102 and a neck 104, but in which different connectors 106 are provided to enable the spike to be used to support different hardware and to enable flat panel displays to be supported on the pole using differently configured mounting hardware. Thus, the manner in which the spike engages the pole will be the same for each of these embodiments. The invention is not limited to the use of a spike with one of the illustrated connectors, as other connectors may be used as well. Similarly, the finger may extend downward from the connector, for example as shown in FIGS. 5-6, or may extend upward from the connector 106, for example as shown in FIGS. 12-13. Additionally, the finger may extend in both directions from the connector 106 so that the connector is placed in a more central location along the finger rather than at an end of the connector.

In the embodiment shown in FIGS. 5-6, the finger 102 includes a spring-biased pin 108 that will enable the spike to be positioned at a desired location along the channel 16 in pole 14. The spring-biased pin 108 may be attached to a handle 110 to enable the pin to be grasped more easily by an operator. As shown in FIG. 5, the pin 108 extends through an aperture 112 in the finger 102 and is sized to be able to move within the aperture. A coil spring 114 is received over the end of the spring and a washer 116 is clipped onto the end of the pin 108 to enable force from the spring to be transferred to the pin. In the embodiment shown in FIGS. 5-6, the spring will bias the end of the pin away from the finger 102 so that the pin will preferentially engage apertures 22 in channel 16 (see FIG. 3). Thus, the spring-biased pin may be used to cause the spike to be retained along channel 16 unless the operator pulls the pin out of engagement to reposition the spike along the channel.

The finger 102 also includes one or more set screws 118 to enable the spike to be fixed in position once its location along the channel has been set. Although two set screws 118 are shown as being provided in the finger 102, the invention is not limited in this manner as other numbers of set screws may be used as well. Likewise, the invention is not limited to an embodiment in which the set screws are used only in the finger as one or more set screws may be placed in other positions on the spike, such as above the neck 104.

A plastic sleeve 120 may be slid over the finger 102 before the finger is inserted into the channel 16. The plastic sleeve 120 optionally may include one or more sacrificial ribs 121 designed to be partially or entirely sheared off during the process of inserting the finger 102 of the spike 100 into the channel 16. The sacrificial ribs 121 may thus be used to ensure a relatively tight fit between the finger and the wide inner region 17 of the channel 16. The plastic sleeve 120 may deform slightly to increase the frictional fit between the finger and the inside of the channel 16 when weight is transferred to the spike from the connector.

The spikes may have many different types of connectors 106 depending on the manner in which they are designed to be used. For example, FIGS. 5 and 6 show an example spike 100A that is configured to be supported along the pole and to connect to an arm 150 and, via the arm, to a flat panel display mount 160. The connector 106A, in this embodiment, is formed as a barrel with a small diameter opening. The barrel, in this embodiment is formed of an upper barrel portion 140 and a lower barrel portion 142 that are configured to be disposed on either side of a matching barrel 152 on the arm 150. In operation, a pin 154 may be inserted through the lower barrel portion 142, matching barrel 152 on arm 150 and upper barrel portion 140 to connect the arm 150 to the spike 100A.

A similar connection may be made between a knuckle 170 that is configured to connect to a flat panel display mount 160. By making the connections on the various parts to be the same, the parts used in connection with the spikes may be interchangeable and used in numerous different combinations without consideration as to whether they will fit together.

In the embodiment shown in FIG. 6, the flat panel display mount includes a central connector 164 and a and a Video Electronics Standards Association (VESA) plate 162 disposed to be rotatable about the central connector. The VESA plate 162 has apertures arranged to enable a flat panel display to be attached to the VESA plate via bolts in a known manner. In the embodiment shown in FIG. 6, the VESA plate has two sets of apertures that will enable flat panel displays in different VESA size categories to be connected to the VESA plate. The invention is not limited in this manner. Since the VESA plate is rotatable about the central connector, a flat panel display that is attached to the VESA plate may be rotated while supported by the flat panel display mount.

FIGS. 7-10 show another embodiment of a spike 100B that has a relatively short neck 104 and a barrel with a relatively large diameter opening 130. This connector may be used to connect to an arm that is configured with a relatively large diameter pin. Similarly, FIG. 11 shows a spike 100C with a short neck and a barrel with a smaller diameter opening 132. This connector may be used to mate with a connector that has a relatively smaller diameter pin.

The neck 104 may be relatively short, as shown in several of the embodiments, or may be longer as shown in connection with FIGS. 12 and 13. The spikes shown in FIGS. 12 and 13 may be used, for example, to enable a computer to be mounted on the pole, by connecting to appropriate hardware brackets. As shown in FIGS. 12 and 13, the spikes may be formed so that the finger is pointed upward when inserted into the channel 16. By pointing the spike upward, the neck may be placed to be close to a bottom end of the pole so that the computer may be supported close to the bottom of the pole. In the embodiment shown in FIGS. 12 and 13, the spike shown in FIG. 12 is configured to attach to a bracket to engage the top of the computer and FIG. 13 is configured to attach to a bracket to engage the bottom of the computer. The invention is not limited in this manner as the connectors may be used for many different purposes without departing from the scope of the invention.

Figure 16:
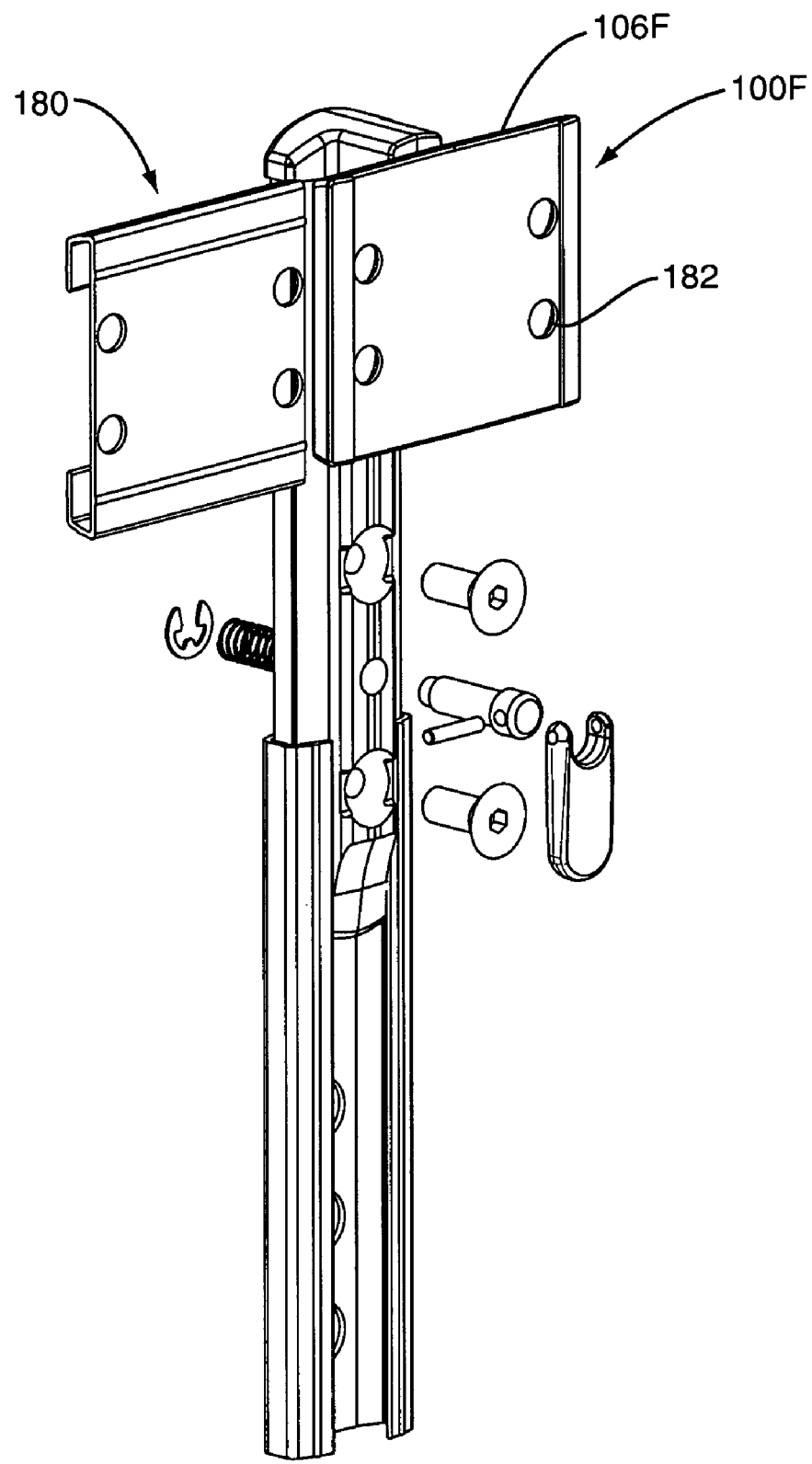
Figure 20:
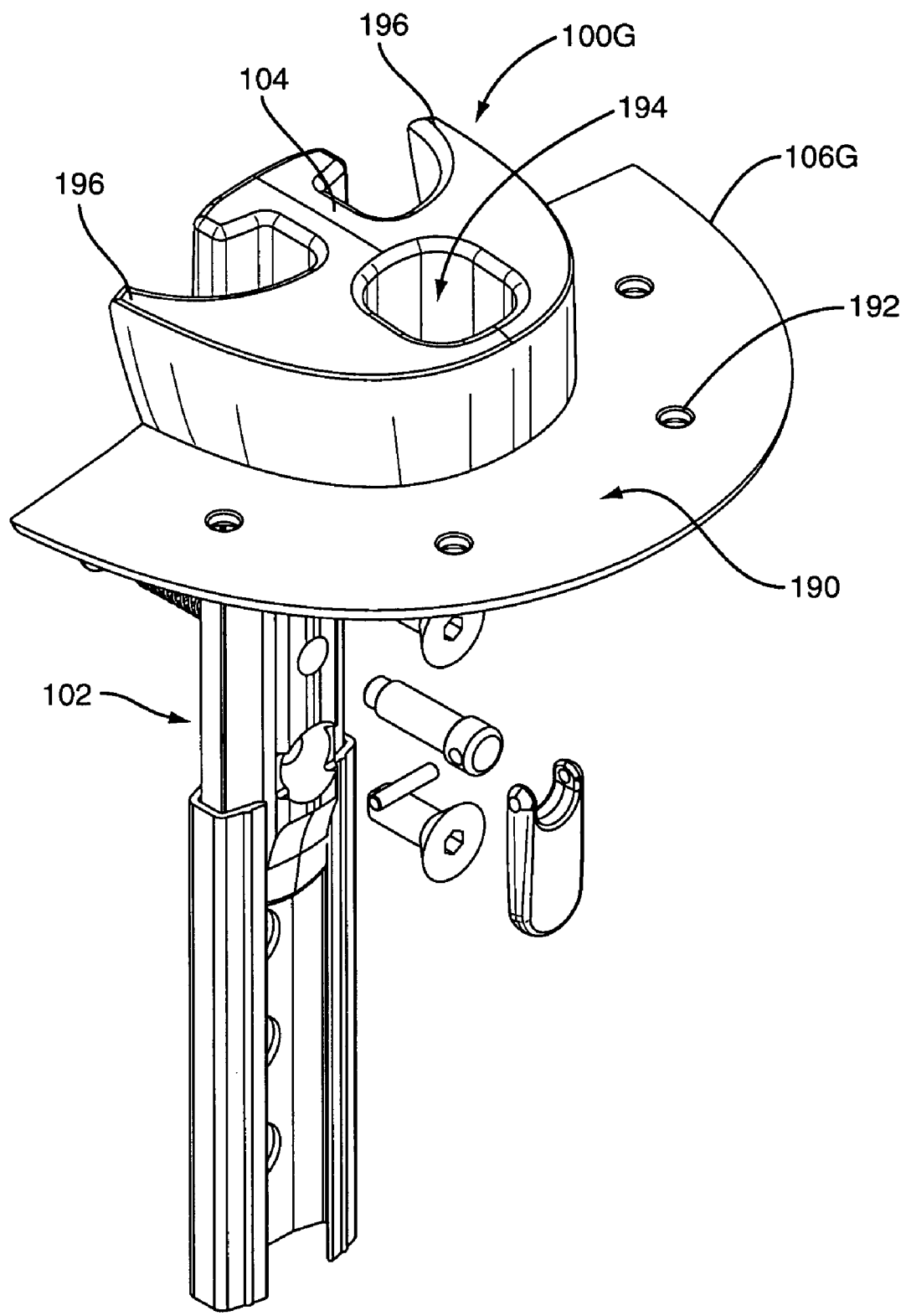

FIGS. 14-16 show another embodiment of a spike that has a connector configured to connect to a rail that will enable multiple flat panel displays to be mounted on a pole. Specifically, in the embodiment shown in FIGS. 14-16, the spike 100F has a connector 106F that is shaped to be flat and relatively square or slightly rectangular. The flat connector 106F will enable a rail (not shown) having a shape approximating that of the plastic sleeve 180 to be slid over the connector and secured in position via bolts through apertures 182. The plastic sleeve 180 is provided to help the connector to slide within a channel in the rail and also to help a compression fit develop between connector 106F and the rail. The rail may be relatively long and have connection points to enable two or more flat panel displays to be connected along its length so that an array of flat panel displays may be supported on a given spike.

FIGS. 17-20 show another embodiment of a spike 100G in which the connector 106G is configured to connect to a table or other flat surface. Specifically, as shown in FIGS. 17-20, the finger 102 is connected by neck 104 to connector 106G that has a flat shelf 190 that is configured to engage the underside of a table so that the table may be supported at a desired position along the pole. For example, if a flat panel display is mounted on the pole, it may be desirable to provide a small table below the flat panel display to hold a key board so that a person may interact with the flat panel display. The embodiment shown in FIGS. 17-20 enables a table or other flat surface to be supported in such a manner. The table may be joined with the connector 106G via screws or bolts that fit through apertures 192. Although the spike 100G has been described as supporting a work surface along the length of the pole, the spike 100G may alternatively be flipped upside-down and used to mount a pole to a flat surface such as a desk or floor.

The connector 106G in the embodiment shown has a cord aperture 194 to enable cords from any supported electronic devices to be fed downward along the pole. The connector 106G also includes wings 196 designed to extend around the outside of the pole and approximate the contour of the pole.

Figure 21:
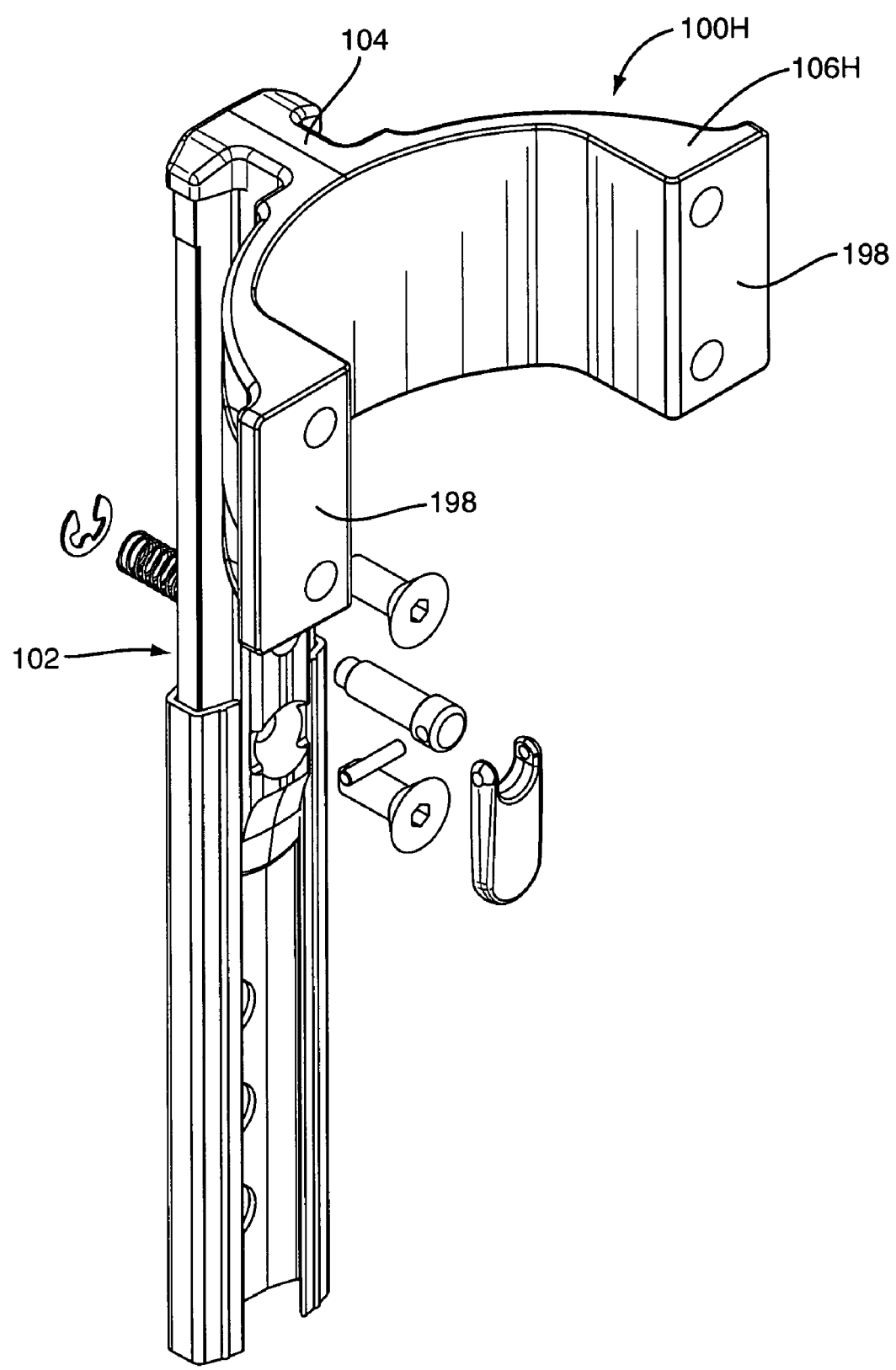
FIGS. 21 and 22 are perspective partially disassembled views of additional spikes that may be used in connection with the pole of FIGS. 2-4 according to an embodiment of the invention.
Figure 22:
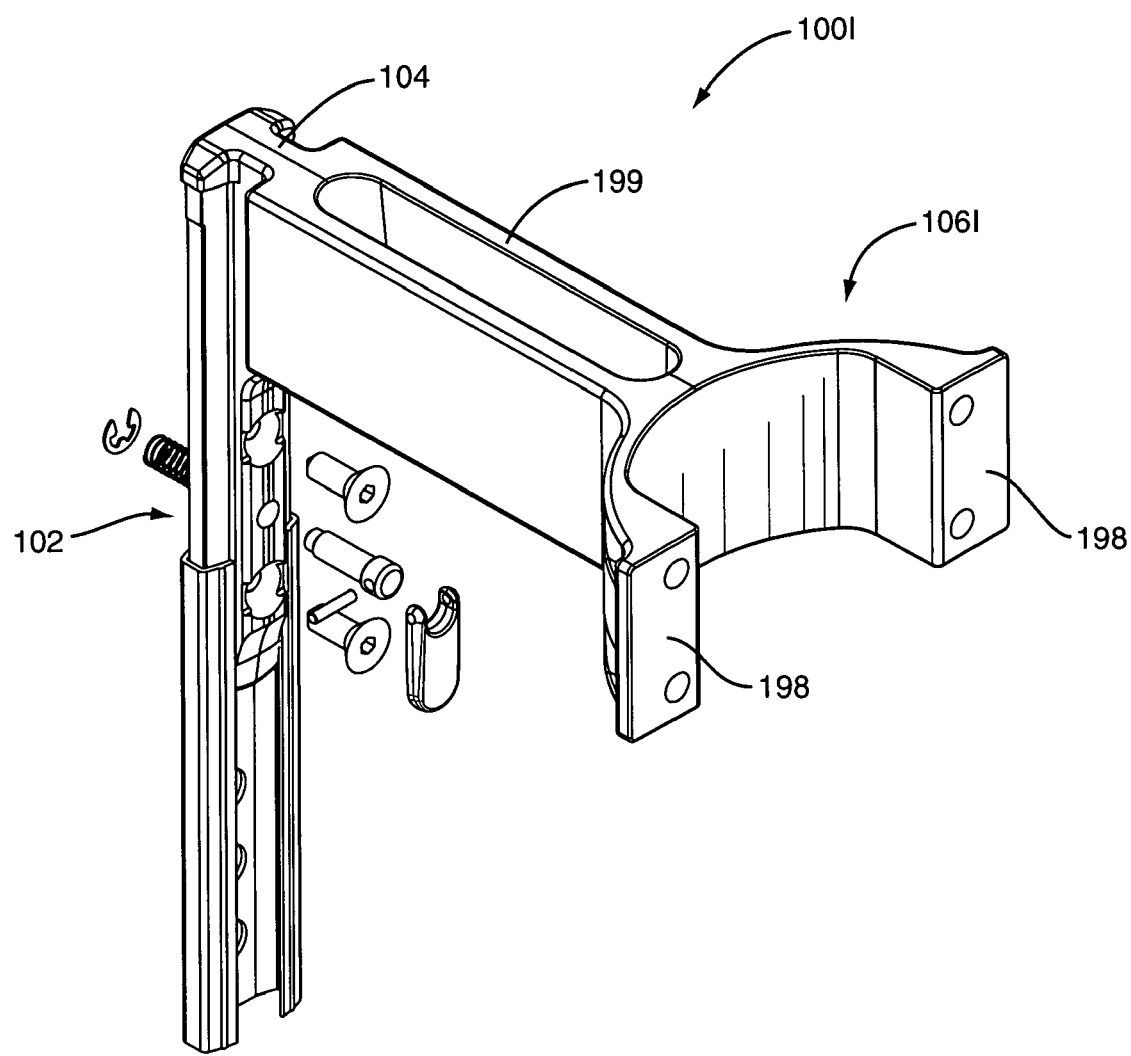

FIGS. 21 and 22 show additional embodiments 100H and 100I in which the connectors 106H and 106I are designed to have a Y-shape. The Y-shape, in this embodiment, is configured to connect to a flat panel display mounting system described in greater detail in U.S. patent application entitled "Universal Mounting System for a Flat Panel Display", Ser. No. 11/410,240 filed on Apr. 24, 2006, the content of which is hereby incorporated herein by reference. Additionally, the Y-shaped connectors may be used to connect to other structures, such as a flat metal plate, that may be used to connect to a flat panel display. For example, where the flat panel display has connection points that correspond to one of the VESA standards, the Y-shaped connector may be connected to a VESA plate that is in turn connected to the flat panel display. The embodiment shown in FIGS. 21 and 22 may therefore be used to connect to many different structures.

In the embodiment shown in FIG. 21, the connector 106H is connected to the neck so that the ends 198 of the Y-shaped connector are relatively close to the finger 102. In the embodiment shown in FIG. 22, the Y-shaped connector is longer and includes an extension 199 such that the ends 198 of the Y-shaped connector are somewhat farther away from the finger 102. The extension 199 enables the flat panel display mounting system to be located farther away from the pole. Depending on the particular manner in which the pole is supported, it may be desirable to cause the flat panel display to be held closer to the pole or farther from the pole so that the center of gravity of the entire system may be adjusted. For example, where the pole is mounted on a K-shaped base, such as the K-shaped base of FIG. 1, the pole is somewhat centered within the area defined by the legs 102. By causing the flat panel display to be held close to the pole, the center of gravity may be kept closer to the center of the area defined by the legs to increase the stability of the flat panel display and mounting system. However, where the pole is mounted on the back of a computer cart, it may be desirable to use a longer arm to move the flat panel display forward above the computer cart so that the weight of the flat panel display is more centrally located over the computer cart. Accordingly, different length connectors may be used to adjust the position of the flat panel display to improve the stability characteristics of the system as a whole.

Although several spikes have been shown and described herein, the invention is not limited to the particular selection of spikes, as spikes with differently configured connectors may be used as well.

Figure 24:
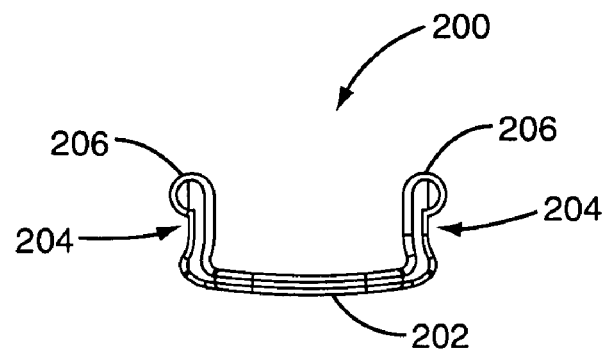
Figure 23:
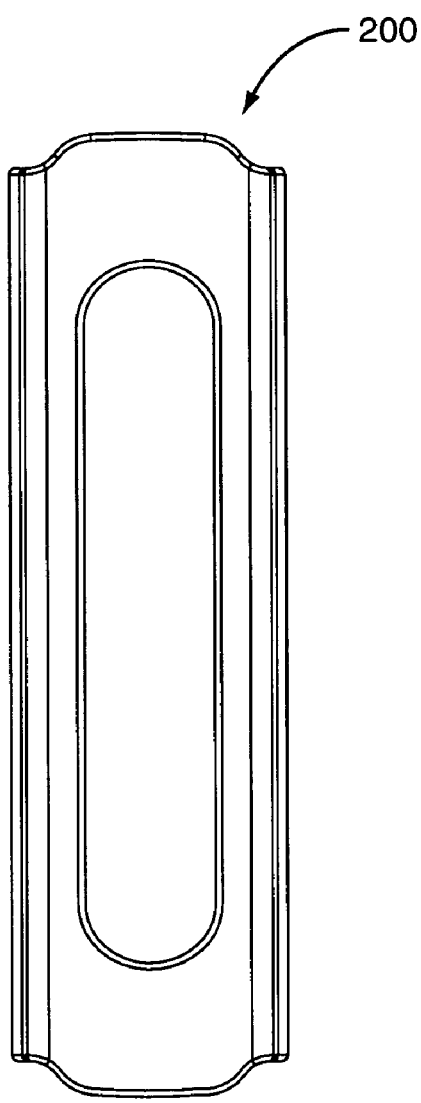
Figure 25:
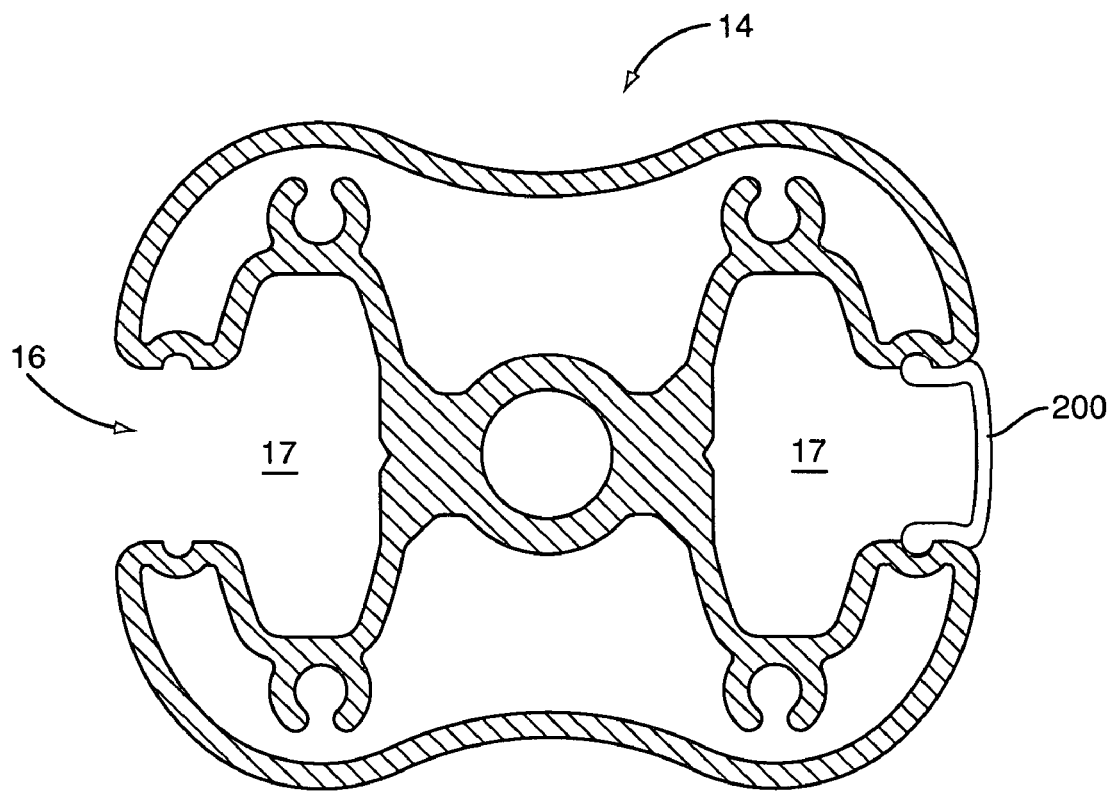
FIG. 25 is a cross-sectional view of the pole of FIG. 1 taken along line IV-IV of FIG. 1, in which a wire management clip has been inserted into the channel.
Figure 26:
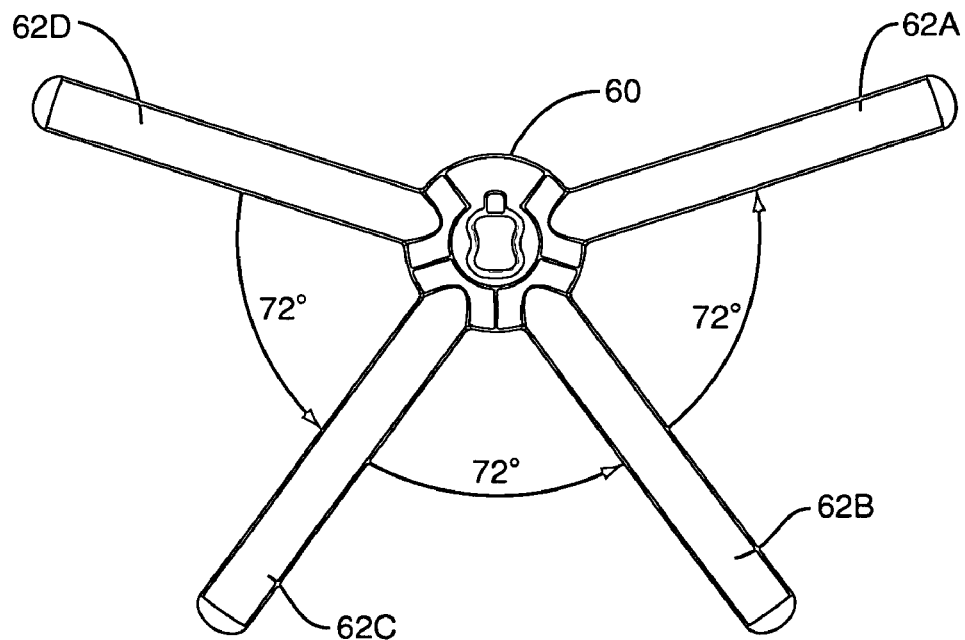
FIG. 26 is a top view and FIG. 27 is a bottom view of a K-base that may be used in connection with the pole of FIGS. 2-4.
Figure 27:
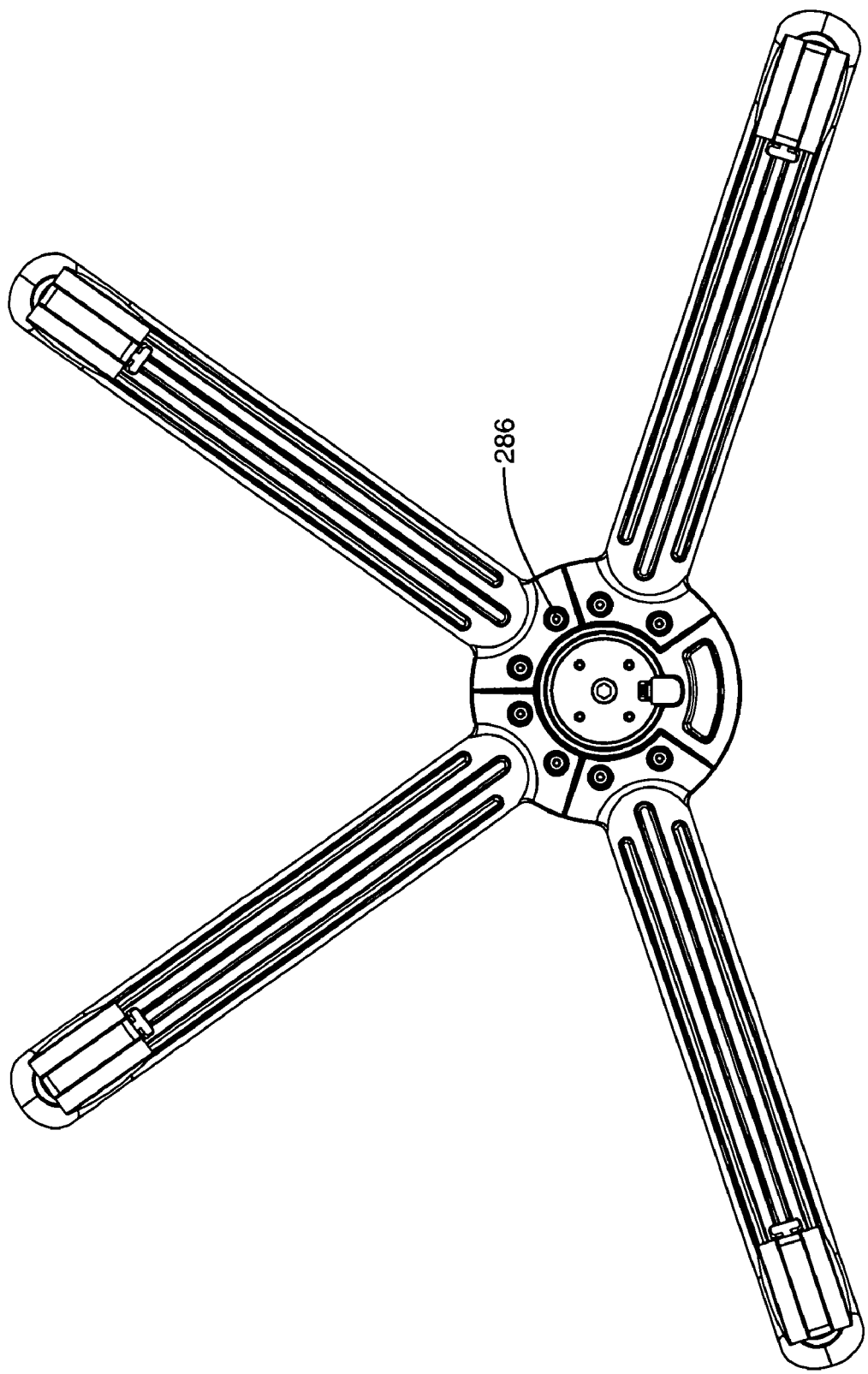

FIGS. 23-25 illustrate a wire management clip that is configured to engage indentations 44 in pole 14 to hold wires within the wide area 17 of the channel 16. As shown in FIGS. 23 and 24, the wire management clip 200 has a mid portion 202 interposed between two wings 204. A bump 206 is formed at the end of each of the wings 204 so that the connector 200 can engage the indentations 44 on the walls 40 of the throat region 19 of channel 16. For example, FIG. 25 shows the bumps 206 on the ends of the wings 204 of the wire management clip 200 engaged with the indentations 44 on the walls 40 of the throat region 19 of channel 16. The clip 200 may be made of plastic or other suitable resilient yet somewhat deformable material. In operation, the user may feed one or more wires into the channel 16 and secure the wires within the channel by inserting one or more wire management clips into the throat region 19 of the channel such that the bumps 206 engage the indentations 44. The resiliency of the clip will cause the bumps to press into the indentations 44 so that the wire management clip may be held in place and, accordingly, so that the wires may be retained within the channel 16.

As mentioned above, the pole 10 may be used in numerous ways to support one or more flat panel displays. One of the bases that may be used in connection with the pole 10, referred to herein as a K-base, is shown in FIG. 1. The K-base is also shown in greater detail in FIGS. 26-30. The pole and spikes described in greater detail above may be used with other bases, carts, and support structures, and the pole mount system is not limited to use with the K-shaped base shown in FIGS. 1 and 26-30.

As shown in FIGS. 1 and 26-30, the K-base has a central hub configured to connect to four legs 62A-62D. The legs are radially spaced at 72 degree intervals to form an approximate K-shape. The central hub 60 has an indent 270 on its top surface with a contour that is designed to approximate the outer surface of the pole. The indent 270 is oriented on the hub 60 such that the pole, when inserted into the indent, will have one of its channels is pointing out between legs 62B and 62C. By orienting the pole to have a channel in this position, when a flat panel display is mounted on the pole, the weight of the flat panel display may be caused to be above the area defined by the legs 102 of the K-base, so that the center of gravity of the system as a whole is close to the center point of the K-base.

Figure 28:
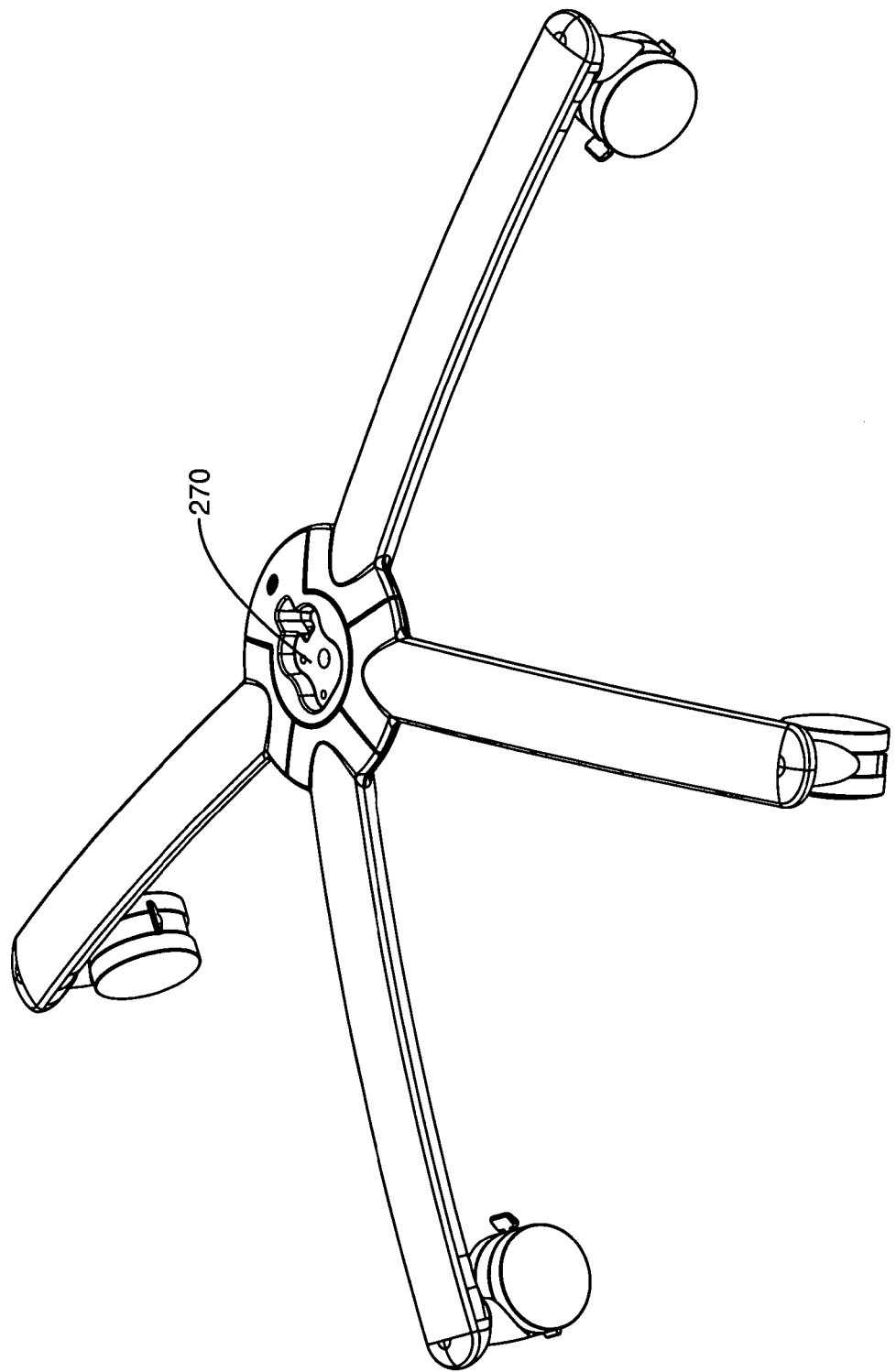
FIG. 28 is a front perspective view of the K-base of FIG. 1.
Figure 29:
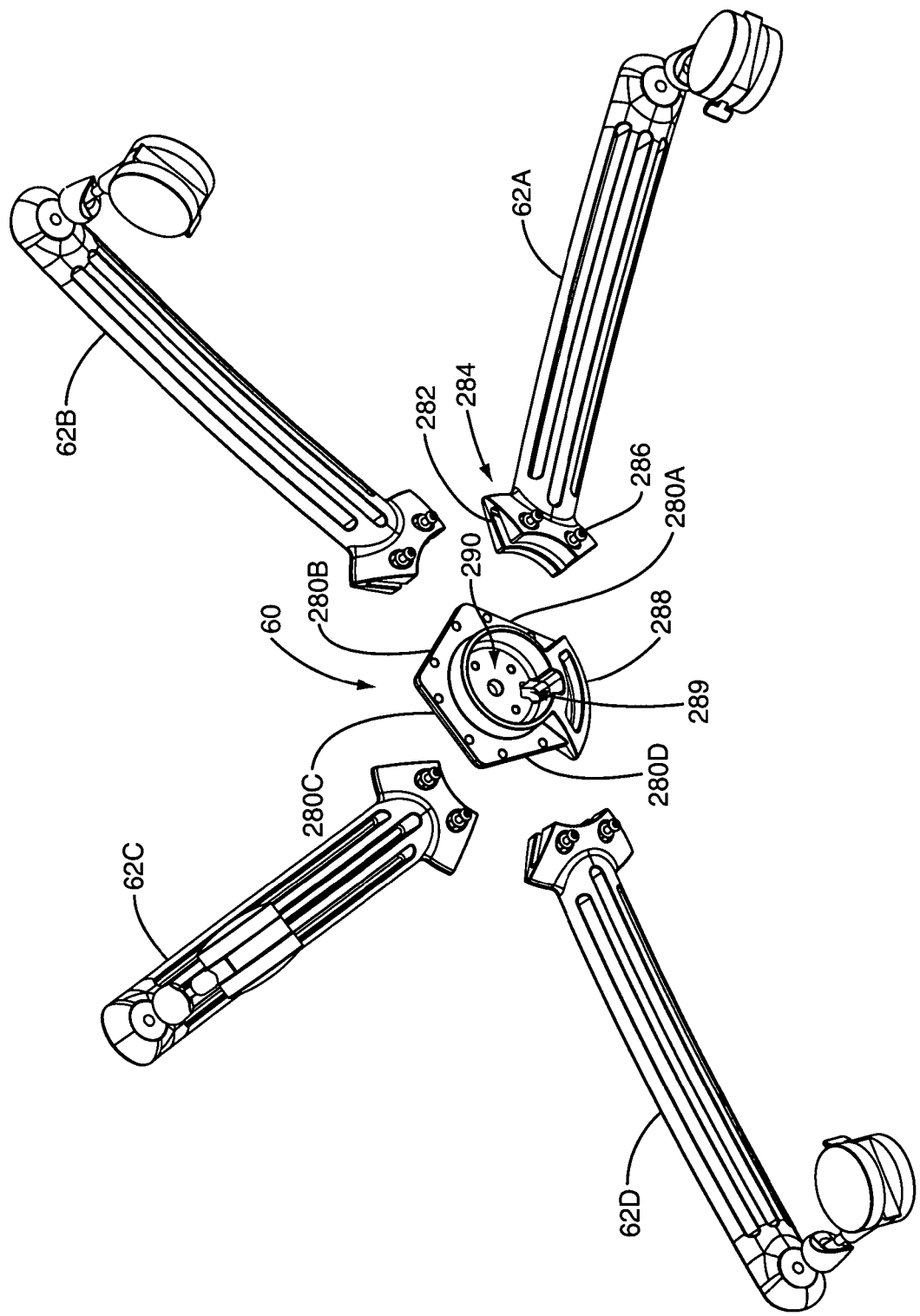
FIG. 29 is a bottom perspective partially disassembled view of the K-base of FIG. 1.

FIG. 28 shows the central hub in greater detail. As shown in FIG. 28, the central hub 60 has a central area 290 configured to connect to a pole, and an outer perimeter configured to connect to the legs. In the embodiment shown in FIG. 28, the outer perimeter has four connection areas 280A-280D, each of which is configured to connect to a leg 62A-62D. The outer perimeter is generally flat, to be received in clefts 282 formed in the ends 284 of the legs 62. Bolts 286 may be used to connect the legs to the central hub. The legs 62 may have one or more castors attached to their distal end to enable the K-base to be rolled on a flat surface.

The central hub is formed as a pentagon, with the outer perimeter extending along four sides of the pentagon. The ends of the legs 284 and a filled-in portion 288 are shaped such that, when the legs are attached to the central hub, the combination resembles a disk (see FIG. 27). Although the central hub 60 in this embodiment has one side of the pentagon filled-in, optionally this side may be altered to enable another leg to extend from the central hub so that the central hub may also be used to implement a star-base. Where the fifth side of the pentagon is altered in this manner to include a connection area, a special leg may also be used to interconnect two hubs, so that a double K-base may be provided.

Figure 30:
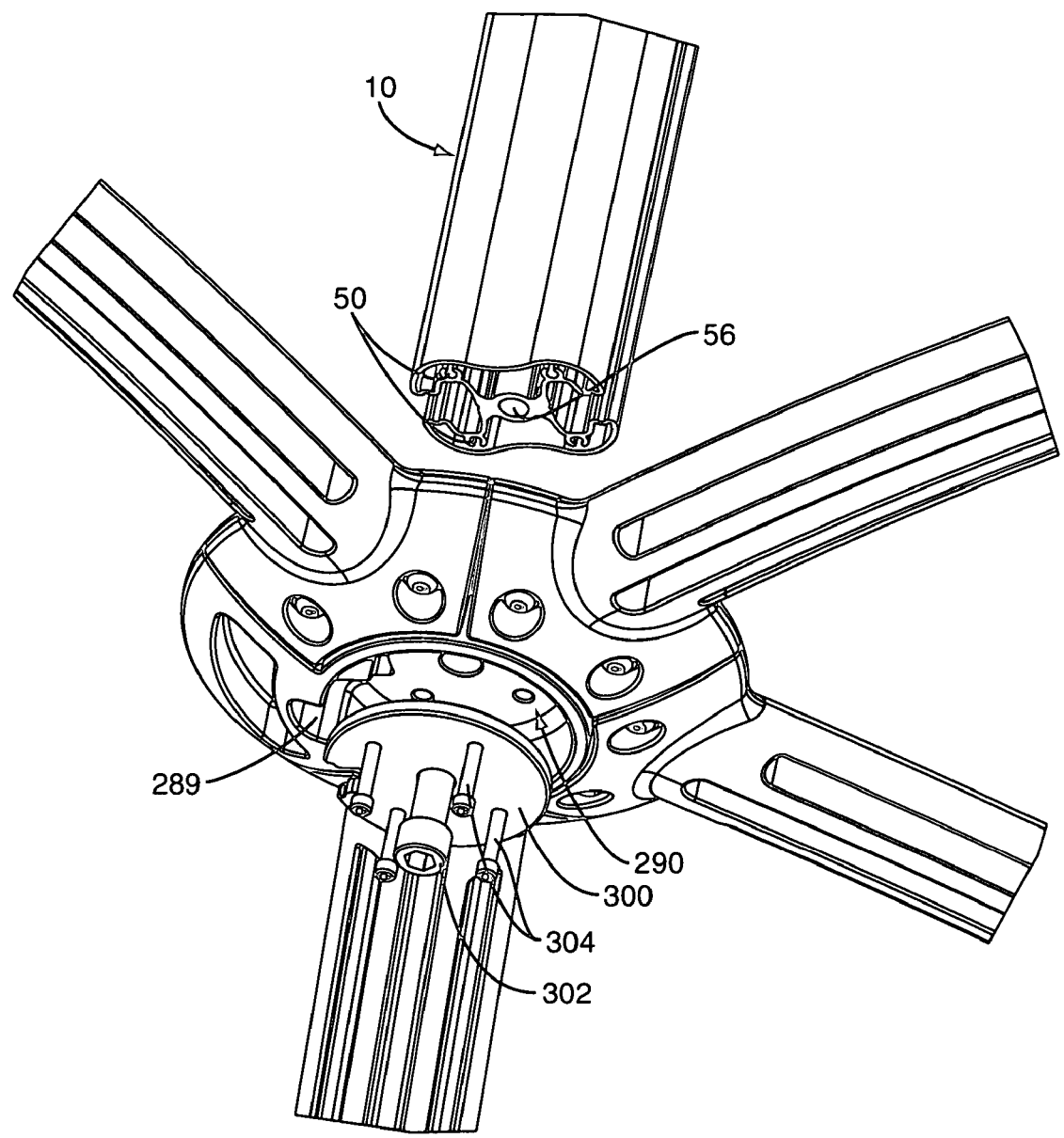
FIG. 30 is an exploded bottom perspective partially disassembled view of the K-base of FIG. 1.

The central area 290 of the central hub 60 is configured to connect to the pole. The connection between the pole and the central hub is shown in greater detail in FIG. 30. As shown in FIG. 30, the central area 290 is formed to be relatively deep to receive a washer 300. Optionally, multiple washers or an additional lead weight may be added and received in this central area 290 to lower the center of gravity of the K-base. Five bolts, a large central bolt 302 and four smaller bolts 304 may be used individually or collectively to connect the K-base to the pole. The four small bolts 304 are threadably received in the partial apertures 50 of the pole 10, and the large center bolt 302 may be threaded into the central aperture 56. The washer 300 may be made of steel or another suitably strong metal and serves to distribute the force of the bolts across the central hub. Where the central hub is made of a material such as aluminum, distributing the forces of the bolts through the washer may help increase the longevity of the K-base.

The central hub 60 may be configured to have additional features such as a wire management aperture 289 configured to enable one or more wires to pass through the hub to the area below the K-base. Other features may be added as well, and the invention is thus not limited to an embodiment having only the particular features described herein.

It should be understood that various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A pole mounting system for supporting an object on the pole, comprising:
    a pole having an outside surface and at least one channel defined therein, said channel having a wide inner region and a narrower throat region extending between the wide inner region and the outside surface, the wide inner region being defined by a back wall having a flat section and a pair of tapered sections defining rear angled surfaces which are disposed at an angle relative to the flat section, a pair of side walls, and a pair of tapered front walls defining front angled surfaces extending between the side walls and an inside end of the narrower throat region; and a spike with a finger configured to be received and retained within the channel, the finger being configured to extend within the channel and the spike being configured to extend out through the narrower throat region to protrude from the channel, the finger having angled rear and front surfaces with angles corresponding to the angles of the rear angled surfaces and front angled surfaces of the channel, such that upon placement of weight on the spike the angled front surfaces of the finger will interact with the angled front surfaces of the channel, and the angled rear surfaces of the finger will interact with the angled rear surfaces of the channel, to cause a compression fit to be formed between the front and rear surfaces of the finger and the front and rear angled surfaces of the channel; and an arm wherein the spike comprises the finger, a connector configured to enable a flat panel display mounting system to be attached to the spike, and a neck configured to extend from the finger toward the connector and the connector comprises a barrel configured to receive a pin;

wherein the barrel has an upper barrel portion and a lower barrel portion, said upper and lower barrel portions being configured to receive a matching barrel portion attached to the arm to be connected to the spike; and wherein the arm has a first end with the matching barrel portion, and a second end with upper and lower barrel portions similar to the upper and lower barrel portions of the spike.

2. The pole mounting system of claim 1, further comprising a Video Electronics Standards Association (VESA) plate and a knuckle configured to be connected between the VESA plate and the second end of the arm.

3. The pole mounting system of claim 2, wherein the VESA plate is rotatably connected to the knuckle.

4. A pole mounting system for supporting an object on the pole, comprising:

a pole having an outside surface and at least one channel defined therein, said channel having a wide inner region and a narrower throat region extending between the wide inner region and the outside surface, the wide inner region being defined by a back wall having a flat section and a pair of tapered sections defining rear angled surfaces which are disposed at an angle relative to the flat section, a pair of side walls, and a pair of tapered front walls defining front angled surfaces extending between the side walls and an inside end of the narrower throat region; and a spike with a finger configured to be received and retained within the channel, the finger being configured to extend within the channel and the spike being configured to extend out through the narrower throat region to protrude from the channel, the finger having angled rear and front surfaces with angles corresponding to the angles of the rear angled surfaces and front angled surfaces of the channel, such that upon placement of weight on the spike the angled front surfaces of the finger will interact with the angled front surfaces of the channel, and the angled rear surfaces of the finger will interact with the angled rear surfaces of the channel, to cause a compression fit to be formed between the front and rear surfaces of the finger and the front and rear angled surfaces of the channel;

wherein the spike includes a spring-biased pin carried on the finger for retaining spike at a desired location along the channel.

* * * * *